(12) United States Patent
Higashiura

(10) Patent No.: US 7,623,269 B2
(45) Date of Patent: Nov. 24, 2009

(54) IMAGE FORMING APPARATUS, IMAGE PROCESSING APPARATUS AND IMAGE FORMING/PROCESSING APPARATUS

(75) Inventor: Masaki Higashiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 636 days.

(21) Appl. No.: 11/305,077

(22) Filed: Dec. 16, 2005

(65) Prior Publication Data

US 2006/0136087 A1 Jun. 22, 2006

(30) Foreign Application Priority Data

Dec. 17, 2004 (JP) ............................. 2004-366767

(51) Int. Cl.
*H04N 1/40* (2006.01)
(52) U.S. Cl. ........................ 358/3.1; 358/468
(58) Field of Classification Search .................. 358/1.9, 358/2.1, 1.15–1.18, 3.01, 468, 498, 296, 358/304–305
See application file for complete search history.

(56) References Cited

U.S. PATENT DOCUMENTS 5,057,070 A * 10/1991 Pidcock ...................... 493/405

5,335,315 A * 8/1994 Yoshida et al. ................ 358/1.9

FOREIGN PATENT DOCUMENTS

| JP | 09-238251 | 9/1997 |
| JP | 2000-353171 | 12/2000 |
| JP | 2002-236830 | 8/2002 |
| JP | 2003-345760 | 12/2003 |
| JP | 2004-104256 | 4/2004 |

* cited by examiner

*Primary Examiner*—Thomas D Lee
*Assistant Examiner*—Stephen M Brinich
(74) *Attorney, Agent, or Firm*—Edwards Angell Palmer & Dodge LLP; David G. Conlin; Peter J. Manus

(57) ABSTRACT

An image reading unit reads a paper formed with a predetermined pattern in a state folded into a predetermined shape, and a recognizing unit detects the shape of the paper based on the obtained image data. The recognizing unit reads the process instructing information corresponding to the detected shape and the obtained image data from the information table, and provides the read process instructing information to an authenticating unit or a setting unit. The authenticating unit executes authenticating process based on the provided process instructing information, and the setting unit executes the setting process based on the process instructing information inputted from the recognizing unit. Therefore, the information necessary for various processes is inputted, and the processes based on the input information are executed by reading the document folded in advance into a predetermined shape without performing troublesome operation such as key operation.

13 Claims, 20 Drawing Sheets

FIG. 3

| PATTERN No. | PROCESS DESIGNA- TING INFO | FOLD LINE DATA | | PATTERN DATA | |
|---|---|---|---|---|---|
| | | FRONT SURFACE | BACK SURFACE | FRONT SURFACE | BACK SURFACE |
| 1 | AUTH. INFO 1 | 2nd: VALLEY- FOLD | 1st VALLEY-FOLD | | |
| 2 | SETTING CONDITION 1 | STAPLE PUNCH 2 in 1 | | | |
| 3 | | | | | |

F I G. 4A
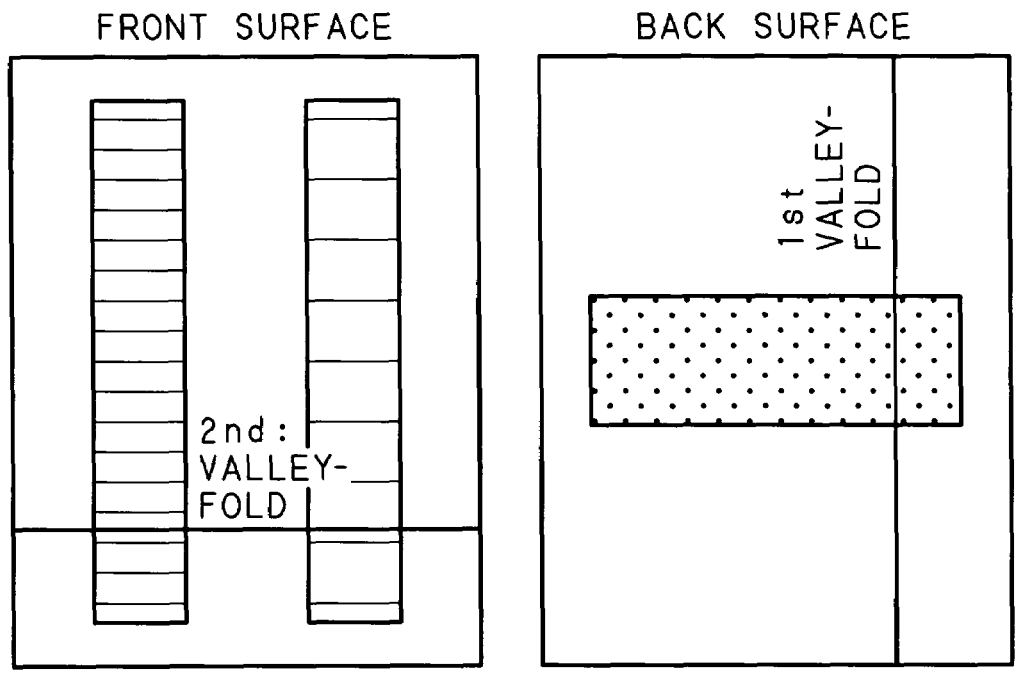
F I G. 4B
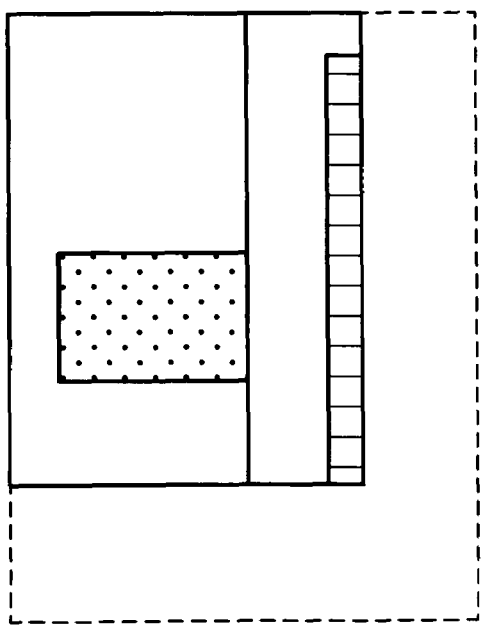

23

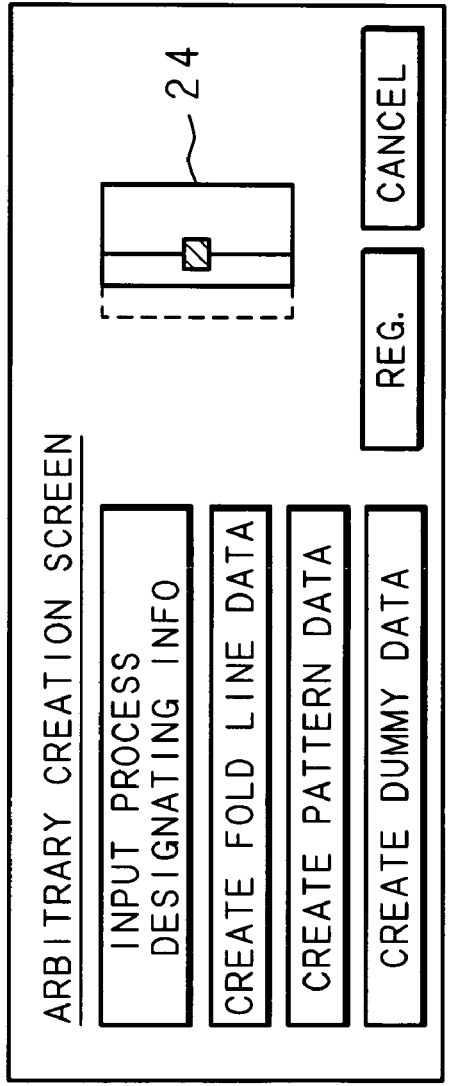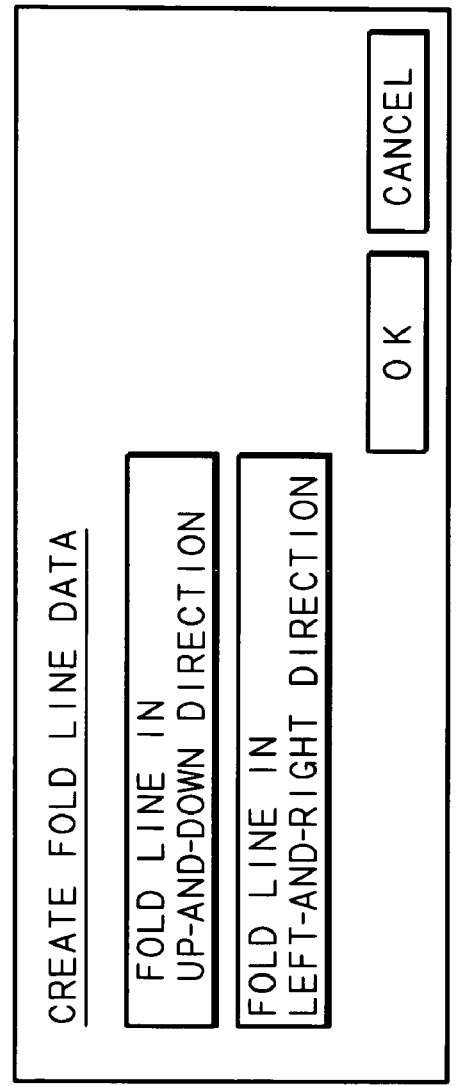

IMAGE FORMING APPARATUS, IMAGE PROCESSING APPARATUS AND IMAGE FORMING/PROCESSING APPARATUS

CROSS-REFERENCE TO RELATED APPLICATIONS

This non-provisional application claims priority under 35 U.S.C. §119(a) on Patent Application No. 2004-366767 filed in Japan on Dec. 17, 2004, the entire contents of which are hereby incorporated by reference.

BACKGROUND OF THE INVENTION

1. Field of the Invention

The present invention relates to an image forming apparatus and an image processing apparatus. More specifically, the present invention relates to an image forming apparatus and an image processing apparatus that do not require complicating key operations and the like when executing various settings, authentication and the like. Further, the present invention relates to an image forming/processing apparatus having both functions.

2. Description of Related Art

Recently, a multi function printer (MFP) in which a copying machine having a printer function is equipped with a facsimile function is being widely used. In such apparatus, the color copying function and the color facsimile communicating function and the like are being equipped with the extension of the printer function. The apparatus with multi-functions has an advantage of effectively executing various functions under a condition desired by the user by appropriately setting various conditions in each function.

Various setting conditions in such apparatus must, for each setting condition, be displayed on a setting screen corresponding to an operation panel and the like attached to the apparatus and sequentially switching the setting screen for setting. Therefore, a considerable work time is required even for users familiar with such operation, and a very complicating key operation is required for users not familiar with the operation. In consideration of such, an apparatus, for example, for reading a paper with various setting information written thereon, and executing character recognition with an OCR (Optical Character Reader) and setting the recognized setting content is disclosed in Japanese Patent Application Laid-Open No. 2000-353171. Further, the apparatus is configured so as to read the paper with checkmarks checked in the check column corresponding to various setting conditions, recognize the checked setting conditions and setting the recognized setting content.

A print system of forming the image based on data such as document, graphics and the like, created in the information processing apparatus such as a personal computer, on a paper in an image forming apparatus such as an MFP has been putted to practical use. The data processed in the information processing apparatus may include data including company secret. Therefore, a function of limiting the use to only the legitimate users by executing authentication of each user when using the apparatus so as not to accidentally leak the data including secrecy is being widely spread.

The method of authenticating each user most often includes a method of registering the user ID and the password to each apparatus in advance and executing authentication based on whether the user ID and the password inputted by each user when using the apparatus matches those registered. However, each user must input the user ID and the password every time the user uses the apparatus and thus is not satisfactory in terms of operationality and convenience. In view of such, an apparatus for authenticating users by reading plural barcodes in a predetermined order is disclosed in Japanese Patent Application Laid-Open No. 2003-345760).

Japanese Patent Application Laid-Open No. 2002-236830 discloses a system for issuing a ticket by distributing the pattern image data of the ticket via the network and printing it with a printer. The system is configured to create converted data based on the image data read from the issued ticket, and comparing the created converted data with the converted data stored in an authenticating terminal to authenticate the user.

However, in the apparatus disclosed in Japanese Patent Application Laid-Open No. 2000-353171, the setting information may not be reliably obtained from the paper depending on the precision of the OCR. Further, when the user makes a check mark on the check column or when writing the desired setting information on the paper, a writing instrument becomes necessary and it also takes a lot of trouble for the user.

In an apparatus for executing various processes using the barcodes such as disclosed in Japanese Patent Application Laid-Open No. 2003-345760, a barcode reader for reading the barcode must be provided. When multiple barcodes are used, the reading order of each barcode becomes complex, and thus increases the load on the user. When only a few barcodes are used, it difficult to prevent spoofing by a third person.

In the system of authenticating the user using the converted data created based on the image data read from the issued ticket as disclosed in Japanese Patent Application Laid-Open No. 2002-236830, the converted data may not be appropriately created if the ticket is damaged or worn. In this case, the user may not be authenticated even if the user has duly bought the ticket.

SUMMARY OF THE INVENTION

The present invention, in view of the above, aims to provide an image forming apparatus for creating a document to be read by the image forming apparatus, that is, the document used in a state folded into a predetermined shape and to be formed with a predetermined image at a predetermined position when folded into the predetermined shape.

The present invention further aims to provide an image forming/processing apparatus that creates the above type of document and uses the created document. Specifically, the present invention aims to provide the image forming/processing apparatus that eliminates the necessity of a key operation by the user, and that is inputted with information necessary for execution of various processes by reading the document folded into a predetermined shape with a normal reading process by using only each part of hardware necessary for the normal operation and not requiring an extra hardware to execute the processes corresponding to the input information.

The present invention further aims to provide an image processing apparatus that eliminates the necessity of the key operation by the user by using the document created by the image forming apparatus or the image forming/processing apparatus, and that executes the processes corresponding to the image data and the shape of the document read from the document with the normal reading process by using only each part of hardware necessary for the normal operation and not requiring an extra hardware.

The image forming apparatus according to the present invention is an image forming apparatus comprising image forming means for forming an image based on image data on a recording carrier, and is characterized by comprising: pattern image storing means for storing plural pattern image data for forming each of plural pattern images on a recording carrier; folding procedure accepting means for accepting a folding procedure for folding the recording carrier; pattern selection accepting means for accepting a selection of the plural pattern image data stored in the pattern image storing means; position accepting means for accepting a forming position of an image based on the pattern image data whose selection is accepted by the folding procedure accepting means on the recording carrier folded according to the folding procedure accepted by the folding procedure accepting means; and image data generating means for generating a folding procedure image data for forming an image showing the folding procedure accepted by the folding procedure accepting means on the recording carrier, and pattern forming image data for forming an image based on the pattern image data whose selection is accepted by the pattern selection accepting means at the forming position accepted by the position accepting means on the recording carrier folded according to the folded procedures accepted by the folding procedure accepting means as one set of image forming information, wherein the image forming means forms on the recording carrier an image based on the folding procedure image data and/or the pattern forming image data included in one set of the image forming information generated by the image data generating means.

In the image forming apparatus according to the present invention described above, plural pattern image data is stored in advance, selection of the folding procedure for folding the recording carrier and the pattern image data stored in advance are respectively accepted, and the forming position of the pattern image based on the selected pattern image data in the recording carrier folded according to the accepted folding procedure is also accepted. The folding procedure image data for forming the image showing the folding procedure, and the pattern forming image data for forming the image based on the selected pattern image data at the forming position of the image in the recording carrier folded according to the folding procedure are generated as one set of image forming information. The image based on the folding procedure image data and/or the pattern forming image data included in the image forming information is formed on the recording carrier.

Therefore, according to the image forming apparatus of the present invention, the recording carrier is created with the pattern image formed at a predetermined position when folded into a predetermined shape. Specifically, the recording carrier for having the image forming apparatus (image processing apparatus) execute the corresponding processes is created when used folded into a predetermined shape when executing various processes and read in a state folded into a predetermined shape.

The image forming apparatus according to the present invention is an image forming apparatus comprising image forming means for forming an image based on image data on a recording carrier, and is characterized by comprising: image forming information storing means for storing plural sets of image forming information combining folding procedure image data for forming an image showing a folding procedure for folding a recording carrier on the recording carrier, and pattern forming image data for forming an image based on the pattern image data for forming a predetermined pattern image at a predetermined position on the recording carrier folded according to the folding procedure; and image forming information selection accepting means for accepting selection of the plural sets of image forming information stored in the image forming information storing means, wherein the image forming means forms on the recording carrier an image based on the folding procedure image data and/or the pattern forming image data included in one set of the image forming information whose selection is accepted by the image forming information selection accepting means.

In the image forming apparatus according to the present invention described above, plural sets of image forming information is stored in advance, which set combines the folding procedure image data for forming the image showing the folding procedure for folding the recording carrier and the pattern forming image data for forming a predetermined pattern image at a predetermined position of the recording carrier folded according to the folding procedure. The selection of the image forming information stored in advance is accepted, and the image based on the folding procedure image data and/or the pattern forming image data included in the image forming information whose selection is accepted is formed on the recording carrier.

Therefore, according to the image forming apparatus of the present invention, the recording carrier formed with a predetermined pattern image at a predetermined position when folded to a predetermined shape is appropriately created as necessary. Specifically, the recording carrier for making the image forming apparatus execute the corresponding processes is created as necessary when used folded into a predetermined shape when executing various processes and read in a state folded into a predetermined shape.

The image forming apparatus according to the present invention is characterized in that the image forming means forms on one recording carrier the image based on the folding procedure image data and the image based on the pattern forming image data included in one set of the image forming information.

In the image forming apparatus according to the present invention described above, the recording carrier formed with the image based on both the folding procedure image data and the pattern forming image data included in one set image forming information, that is, formed with both the folding procedure image and the pattern image is created.

Therefore, according to the image forming apparatus of the present invention described above, the recording carrier in which both the folding procedure image and the pattern image are formed on one recording carrier (one sheet of paper), and thus when the recording carrier is folded according to the folding procedure image, the recording carrier that can be immediately used is obtained.

The image forming apparatus according to the present invention is characterized by further comprising displaying means for displaying the image showing the folding procedure based on the folding procedure image data included in one set of the image forming information, wherein the image forming means forms on the recording carrier the image based on the pattern forming image data of the same set as the folding procedure image data of the image showing the folding procedure displayed on the displaying means.

In the image forming apparatus according to the present invention described above, the image based on the folding procedure image data included in one set of image forming information is displayed on a monitor and the like, and only the pattern image based on the pattern forming image data of the same set as the image showing the displayed folding procedure is formed on the recording carrier.

Therefore, according to the image forming apparatus of the present invention, the image showing the folding procedure is not formed on the recording carrier, and thus even if a third person obtains the recording carrier formed with the pattern image, the third person will not know the proper folding procedure. Thus, the illegal use of the recording carrier formed with only the pattern image by the third person is not possible and security is enhanced.

The image forming apparatus according to the present invention is characterized in that the image forming means forms the image based on the folding procedure image data and the image based on the pattern forming image data included in one set of the image forming information on a different recording carrier.

In the image forming apparatus according to the present invention described above, the fold procedures image based on the folding procedure image data and the pattern image based on the pattern image data included in one image forming information are each formed on the different recording carrier.

Therefore, according to the image forming apparatus of the present invention described above, even if the recording carrier formed with the image showing the folding procedure is obtained by the third person, the third person will not know the proper folding procedure since the pattern image is not formed on the same recording carrier. Thus, illegal use by the third person is not possible and security is enhanced.

The image forming apparatus according to the present invention is characterized in that the pattern image data includes directional image data for forming a directional image indicating the up-and-down direction on the recording carrier folded according to the folding procedure shown by the image based on the folding procedure image data.

In the image forming apparatus according to the present invention described above, the directional image showing the up-and-down direction is formed on the recording carrier used in a state folded to a predetermined shape.

Therefore, according to the image forming apparatus of the present invention described above, the proper usage method at using the recording carrier, specifically, the direction at reading the recording carrier is easily understood by the user and thus operationality is enhanced.

The image forming apparatus according to the present invention is characterized by further comprising means for externally transmitting the image forming information.

In the image forming apparatus according to the present invention described above, the image forming information is externally transmitted as necessary.

Therefore, according to the image forming apparatus of the present invention, the image forming information can be retained by external apparatus, and thus the image based on the image forming information is formed on the recording carrier using the other image forming apparatus as necessary to create the document.

The image forming apparatus according to the present invention is an image processing apparatus comprising reading means for reading a document and obtaining image data, and executing image process based on the image data obtained by the reading means, characterized by comprising: storing means for storing process designating information for specifying a process to be executed in correspondence with a shape of a document and image data of an image formed on the document; detecting means for detecting a shape of a document based on the image data obtained by the reading means; and processing means for, by reading the process designating information corresponding to the image data obtained by the reading means and the shape detected by the detecting means from the storing means, executing a process based on the read process designating information.

In the image forming apparatus according to the present invention described above, the process designating information for specifying the process to be executed is stored in advance in correspondence with the shape of the document and the image data of the image formed on the document. The shape of the document is detected based on the image data obtained by reading the document, and when the process designating information corresponding to the detected shape and the image data obtained from the document is stored, the process based on the information is executed.

According to the image processing apparatus of the present invention described above, the information necessary for executing various processes can be inputted by reading the document folded to a predetermined shape in advance by the normal reading process. Thus, the operationality is enhanced since the user does not need to operate the operating key. Further, the apparatus such as a barcode reader for reading various information does not need to be separately provided.

The image processing apparatus according to the present invention is characterized in that the processing means executes no process when the process designating information corresponding to the image data obtained by the reading means and the shape detected by the detecting means is not stored in the storing means.

In the image processing apparatus according to the present invention, when the process designating information corresponding to the image data obtained by reading the document and the shape of the document detected based on the image data is not stored, none of the process is executed.

Therefore, according to the image processing apparatus of the present invention, the illegal use by the user who does not know the appropriate folding procedure of the document for inputting the information necessary for executing various processes is prohibited. For instance, when the image that is not exposed on the reading surface by folding the document according to the proper folding procedure is exposed on the reading surface if the document is folded according to the wrong folding procedure, or when the image that is exposed on the reading surface by folding the document according to the proper folding procedure is not exposed on the reading surface if the document is folded according to the wrong folding procedure, execution of various processes by the document folded according to the wrong folding procedure is prohibited, and thus security is enhanced.

The image processing apparatus according to the present invention is characterized in that the information stored in the storing means includes authentication information, and the processing means executes authenticating process based on the authentication information read from the storing means in correspondence with the image data obtained by the reading means and the shape detected by the detecting means.

In the image processing apparatus according to the present invention described above, the authentication information corresponding to the shape of the document and the image data of the image formed on the document is stored in advance. The shape of the document is detected based on the image data obtained by reading the document, and when the authentication information corresponding to the detected shape and the image data obtained from the document is stored, the authentication process is executed.

Therefore, according to the image processing apparatus of the present invention, the input of the information necessary for authentication is possible by reading the document folded to a predetermined shape in advance by a normal reading process. The user thus does not need to input password and the like when executing authentication, and operationality is enhanced. Further, as long as the folding procedure of the document to a predetermined shape is not leaked, even if the document used for authentication by being folded to a predetermined shape is obtained by a third person who does not have the appropriate usage authority, the third person is not able to fold the document into a predetermined shape, and thus spoofing by the third person is prevented.

The image processing apparatus according to the present invention is characterized in that the information stored in the storing means includes setting conditions related to image process, and the processing means executes setting process based on the setting conditions read from the storing means in correspondence with the image data obtained by the reading means and the shape detected by the detecting means.

In the image processing apparatus according to the present invention described above, the setting condition relating to the image process is stored in advance in correspondence with the shape of the document and the image data of the image formed on the document. The shape of the document is detected based on the image data obtained by reading the document, and when the setting condition corresponding to the detected shape and the image data obtained from the document is stored, the setting process based on the corresponding setting condition is executed.

Therefore, according to the image processing apparatus of the present invention described above, the setting condition is inputted by reading the document folded into a predetermined shape in advance by a normal reading process, and thus the user is able to set various setting conditions relating to the image processing without performing a complicated key operation.

The image processing apparatus according to the present invention is characterized in that the information stored in the storing means includes non-permitted information that does not permit execution of process, and the processing means executes no process when the non-permitted information is read from the storing means in correspondence with the image data obtained by the reading means and the shape detected by the detecting means.

In the image processing apparatus according to the present invention described above, the non-permitting information that does not permit the execution of the process is stored in advance in correspondence with the shape of the document and the image data of the image formed on the document. The shape of the document is detected based on the image data obtained by reading the document, and when the non-permitting information corresponds to the detected shape and the image data obtained from the document, none of the process is executed.

Therefore, according to the image processing apparatus of the present invention, when the non-permitting information is exposed on the reading surface at folding the document according to the wrong folding procedure, the execution of the process is prohibited when the image including the on-permitting information is read, and security is enhanced.

The image processing apparatus according to the present invention is characterized in that the document is formed with an image to be read by the reading means as the image data corresponding to each process in a state folded into a shape corresponding to each process.

In the image processing apparatus according to the present invention described above, the image to be read by a scanner and the like is formed on the document read for executing various processes as the image data corresponding to each process with the document folded into a shape corresponding to each process.

Therefore, according to the image processing apparatus according to the present invention described above, the corresponding process is executed based on the image and the shape of the document formed only when the document is folded into an appropriate shape, and thus if the document is folded according to the wrong folding procedure that do not correspond to the image formed on the document, the execution of various processes is prohibited, and security is enhanced.

The image forming apparatus according to the present invention is characterized in that the document is formed with an image indicating the reading direction by the reading means.

In the image forming apparatus according to the present invention described above, an image indicating the reading direction is formed on the document to be read to execute various processes.

Therefore, according to the image processing apparatus according to the present invention, the reading direction of the document folded into a predetermined shape is specified, and the user makes the document to be read in accordance with the specified direction. Thus, input of the process designating information for specifying various processes is reliably executed based on the image data.

The image forming apparatus according to the present invention is characterized in that the document is formed with a directional image indicating the up-and-down direction, means for executing image process to rotate the image data obtained by the reading means so as to direct in a direction indicated by the directional image is provided, the detecting means detects a shape of the document based on the rotated image data, and the processing means reads process designating information corresponding to the rotated image data and the shape detected by the detecting means, and executes a process based on the read process designating information.

In the image forming apparatus according to the present invention described above, a directional image indicating the up-and-down direction is formed on the document to be read to execute various processes, and thus image process for rotating the image data obtained from the document to a direction indicated by the directional image becomes possible.

Therefore, according to the image processing apparatus of the present invention, the shape of the document is detected based on the rotated image data, and process corresponding to the detected shape and the rotated image data is executed. Thus, even if the document folded into a predetermined shape is read from any direction, the corresponding various processes are reliably executed.

The image forming/processing apparatus according to the present invention is an image forming/processing apparatus for forming an image based on image data and executing a process based on a read image data, characterized by comprising: pattern image storing means for storing plural pattern image data for forming each of plural pattern images on a recording carrier; process information storing means for storing process designating information specifying a process to be executed in correspondence to each of the plural pattern image data; folding procedure accepting means for accepting a folding procedure for folding the recording carrier; pattern selection accepting means for accepting a selection of the plural pattern image data stored in the pattern image storing means; position accepting means for accepting a forming position of an image based on the pattern image data whose selection is accepted by the folding procedure accepting means on the recording carrier folded according to the folding procedure accepted by the folding procedure accepting means; image data generating means for generating a folding procedure image data for forming an image showing the folding procedure accepted by the folding procedure accepting means on the recording carrier, and pattern forming image data for forming an image based on the pattern image data whose selection is accepted by the pattern selection accepting means at the forming position accepted by the position accepting means on the recording carrier folded according to the folded procedures accepted by the folding procedure accepting means as one set of image forming information; image forming means for forming on the recording carrier an image based on the folding procedure image data and/or the pattern forming image data included in one set of the image forming information generated by the image data generating means; reading means for reading the image formed on the recording carrier folded according to the image showing the folding procedure formed by the image forming means, and obtaining image data; and processing means for, by reading the process designating information corresponding to the pattern image data that matches the image data obtained by the reading means from the process information storing means, executing a process based on the read process designating information.

In the image forming/processing apparatus according to the present invention described above, the folding procedure for folding the recording carrier and selection of the pattern image data are respectively accepted, and the forming position of the image based on the selected pattern image data in the recording carrier folded according to the accepted folding procedure is also accepted. The folding procedure image data showing the folding procedure, and pattern forming image data for forming the image based on the selected pattern image data at a forming position of the recording carrier folded according to the accepted folding procedure are generated as one set of image forming information. The image based on the folding procedure image data and the pattern forming image data included in the image forming information is formed on the recording carrier. The recording carrier formed with the image by the image forming information is read and the image data thereof is obtained, and the processes based on the process designating information corresponding to the obtained image data are executed.

Therefore, according to the image forming/processing apparatus of the present invention, the image forming apparatus having satisfactory operationality in which the process corresponding to the shape of the folded recording carrier and the pattern image formed is executed by simply reading the recording carrier folded to a predetermined shape in advance by a normal reading process without requiring the input of various information from the operation panel when executing various processes is achieved. An apparatus such as a barcode reader for reading various information does not need to be separately provided.

The above and further objects and features of the invention will more fully be apparent from the following detailed description with accompanying drawings.

BRIEF DESCRIPTION OF THE DRAWINGS

FIG. 3 is a schematic diagram showing one example of a storage content of a pattern table;

FIG. 4A and FIG. 4B are schematic diagrams showing examples of a fold line and a pattern formed on a paper;

FIG. 15A, FIG. 15B, FIG. 15C and FIG. 15D are schematic diagrams showing configuration examples of the registration screen;

DETAILED DESCRIPTION OF THE PREFERRED EMBODIMENTS

Figure 1:
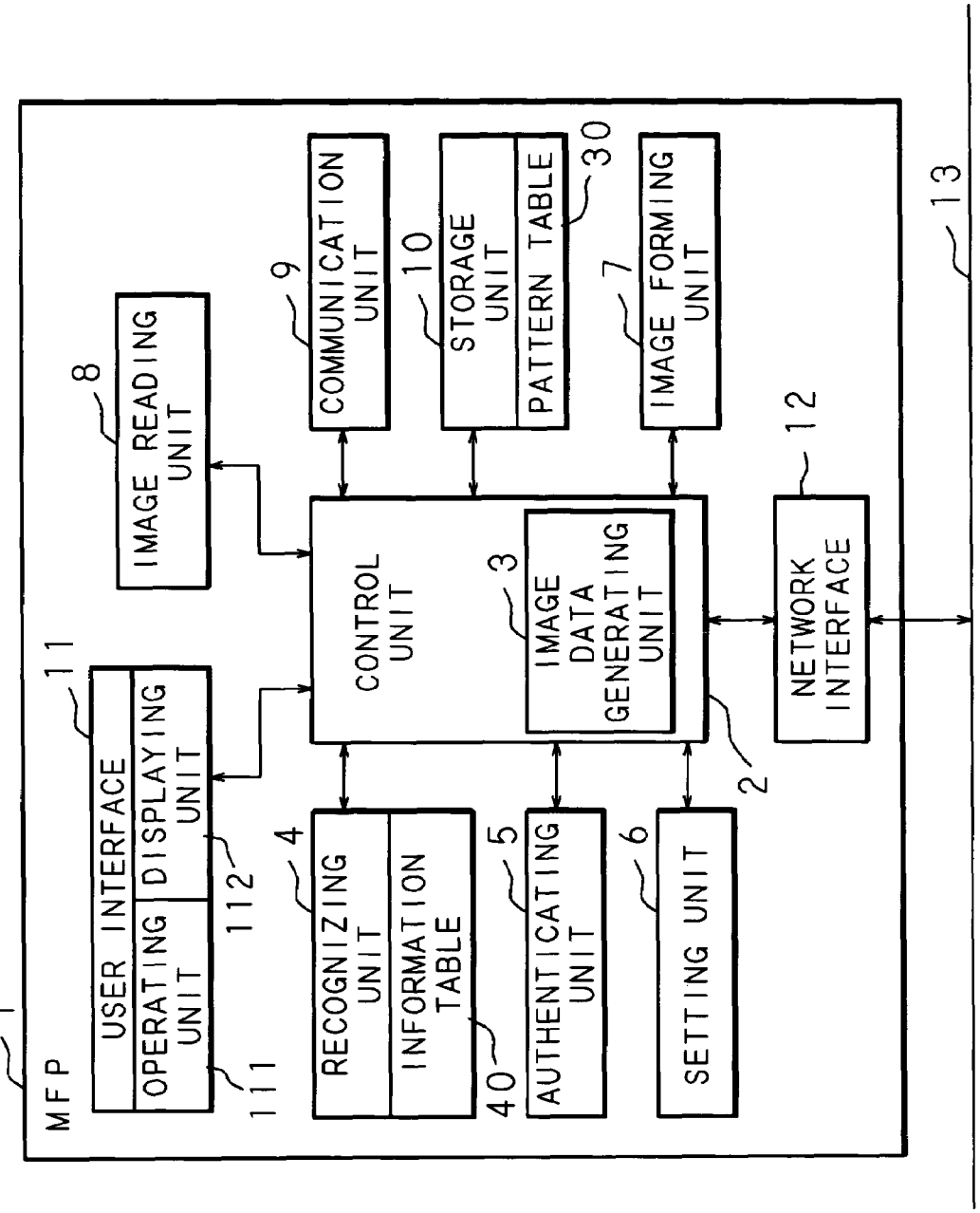
FIG. 1 is a block diagram showing an example of an inner configuration of an MFP according to the present invention.

An image forming apparatus and am image processing apparatus according to the present invention will now be specifically described based on the drawings illustrating a multi function printer (MFP) of one embodiment. The MFP of the present embodiment is also an image forming/processing apparatus. FIG. 1 is a block diagram showing an example of an internal configuration of the MFP according to the present invention. The MFP 1 of the present embodiment includes a control unit 2 constituted from such as a CPU (Central Processing Unit) or an MPU (Micro Processor unit) for a control center. A recognizing unit 4, an authenticating unit 5, a setting unit 6, an image forming unit 7, an image reading unit 8, a communication unit 9, a storage unit 10, an user interface 11, a network interface 12, and the like are connected to the control unit 2, and the control unit 2 controls the operation of each component of the hardware.

The control unit 2 has a ROM for storing, in advance, control program and various data which describes it's controlling procedures and a RAM for temporarily storing various data generated during execution of the control program. When the control unit 2 appropriately reads the control program stored in the ROM to the RAM and executes it, the MFP 1 operates as the image forming apparatus and the image processing apparatus of the present invention.

An image data generating unit 3 is a functional block in the control unit 2 representing the function of generating the image data to make the image forming unit 7 form the image.

The image reading unit 8 is a scanner apparatus equipped with a light source for irradiating the light to the document to be read, an image sensor using a CCD (Charge Coupled Device) and the like and an A/D converter and the like. The image reading unit 8 makes the image sensor image the image of the document set to a predetermined read position and converts it to an analog electric signal, and then A/D converts the obtained analog electric signal with the A/D converter. The image reading unit 8 performs correction of light distribution property of the light source at the time of document reading, sensitivity unevenness of the image sensor and the like on the digital signal obtained through A/D conversion to generate and store the image data of digital format in the storage unit 10.

The communication unit 9 has an NCU (Network Control Unit) and the like connected to a fax modem capable of facsimile communication and public switched telephone network (PSTN). When the NCU connects the facsimile modem to the PSTN as necessary, facsimile communication becomes possible with the external facsimile machine via the PSTN. The network interface 12 is an interface for connecting to a network 13 such as LAN (Local Area Network), for example, and performs data communication with computers connected to the network 13.

Data received by the communication unit 9 from the external facsimile machines, and the data received by the network interface 12 via the network 13 are stored in the storage unit 10. Further, the communication unit 9 and the network interface 12 transmit various data stored in the storage unit 10 to the external facsimile machines and computers, respectively.

The storage unit 10 is configured by, for example, an HDD device which is a mass storage apparatus. The storage unit 10 stores image data read and generated by the image reading unit 8 by reading the image of the document, the image data received by the communication unit 9 from the external facsimile machines, and various data received by the network interface 12 from the external computers. Further, a pattern table 30 (image forming information storing means) to be hereinafter described is stored in an appropriate storage area within the storage unit 10.

The image forming unit 7 includes, for example, a charger for charging a photosensitive drum to a predetermined potential, a laser write apparatus for emitting laser light according to the image data and generating an electrostatic latent image on the photosensitive drum, a developer for supplying toner to the electrostatic latent image formed on the surface of the photosensitive drum and developing it, a transfer apparatus for transferring the toner image formed on the surface of the photosensitive drum onto a sheet of recording carrier such as a paper or an OHP film (none of which are shown) and the like, and is image forming means for forming the image desired by the user on the paper (recording carrier) by an electro photographic method. The image forming unit 7 is not limited to a configuration of executing image forming by an electro photographic method using the above mentioned laser write apparatus, and may of course have a configuration for executing image forming by an ink jet method, thermal-transfer method, sublimation method etc.

The user interface 11 is, specifically, an operation panel of touch-panel type, and includes an operating unit (each accepting means) 111 for accepting operation instructions of the user, and a displaying unit (displaying means) 112 for displaying information to be notified to the user. The operating unit 111 is realized as an image of the operation panel displayed on the displaying unit 112, and various operation buttons for accepting the operation instructions from the user are displayed. The operating unit 111 accepts instructions from the user such as, setting value in each function of number of prints, copy concentration and the like, switching operation of each function, and executing instruction and the like of each process. The displaying unit 112 is configured by, for example, a liquid-crystal display, and displays the operation panel serving as the operating unit 111. The displaying unit 112 also displays operating condition of the MFP 1, various setting values inputted through the operating unit 111, information to be notified to the user and the like.

According to the above configuration, the MFP 1 functions as a facsimile machine of transmitting the image data obtained by the image reading unit 8 by reading the document placed by the user on a predetermined document platen (not shown) to the external facsimile machine connected to the PSTN via the communication unit 9, and receiving the image data transmitted by the external facsimile machine through facsimile communication via the PSTN.

The MFP 1 also functions as a copy machine for copying the image with the image forming unit 7 based on the image data obtained while the image reading unit 8 reads the document onto the paper (recording carrier). Further, the MFP 1 also functions as a network scanner for transmitting the image data read from the document by the image reading unit 8 from the network interface 12 to the external computer connected to the network 13. Moreover, the MFP 1 also functions as a network printer for recording the image based on the data externally received via the network 13 by the network interface 12 onto the paper with the image forming unit 7.

In the MFP 1 described above, it is configured so as to accept the various setting conditions set by the user when, for example, turning on the power, and setting the same. Therefore, when the user suitably operates the operating unit 111 of the user interface 11, the user can se a predetermined setting condition to the MFP 1. The MFP 1 is configured to require authentication when the user uses it during the normal operation. Thus, the user executes authentication by inputting the authentication information following the instructions displayed on the displaying unit 112 of the user interface 11.

Figure 2:
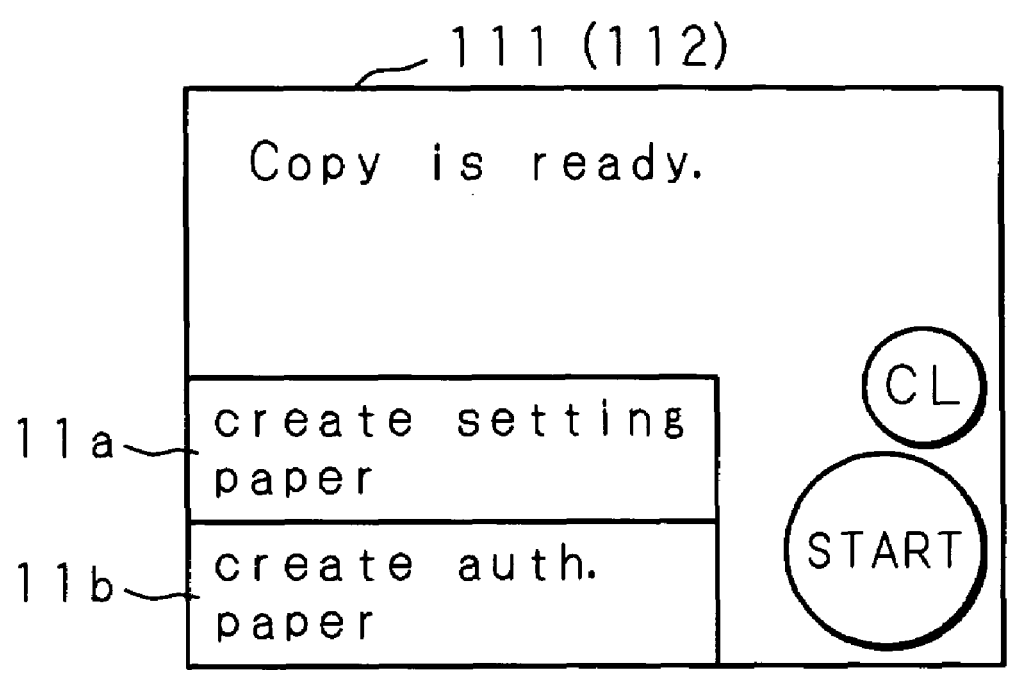
FIG. 2 is a schematic diagram showing one example of a waiting screen displayed on the MFP.

The MFP 1 of the present embodiment differs from a conventional apparatus of this kind, and is configured to execute input of various setting conditions such as described above and input of authentication information by reading the paper (document, recording carrier) folded into a predetermined shape without operating the operating unit 111 of the user interface 11. FIG. 2 is a schematic diagram showing one example of a standby screen displayed on the displaying unit 112 (operating unit 111) of the user interface 11 of the MFP 1. As shown in FIG. 2, "Copy is ready" is displayed on the standby screen. In this case, a "create setting paper" button 11a and a "create authentication paper" button 11b are displayed along with the "start" button for starting copy or facsimile transmission, and "CL (clear)" button for returning the various setting conditions to the default condition.

In such standby screen, when the user operates the "create setting paper" button 11a or "create authentication paper" button 11b, the control unit 2 transfers the data corresponding to the operated buttons to the image forming unit 7 to make the image forming unit 7 generate the paper corresponding to the operated buttons. At this time, the control unit 2 uses the content of the pattern table as shown in FIG. 3 stored in the pattern table 30 stored in the storage unit 10. That is, the control unit 2 reads the fold line data (folding procedure image data: image data for forming an image showing the folding procedure on a paper) corresponding to the button operated by the user, and the pattern data (pattern forming image data: image data for forming pattern image on a paper) from the pattern table 30 and transfers the same to the image forming unit 7.

As shown in FIG. 3, in the pattern table 30, process designating information of each set specified by a pattern number, fold line data (folding procedure image data), pattern data (pattern image forming data) for forming pattern image of hatching pattern, dot pattern and the like on a paper are stored for every paper which is created when the user operates the "create setting paper" button 11a or the "create authentication paper" button 11b. In addition, such combination of the image data including one set of fold line data and pattern data is hereinafter called as an image forming information. Therefore, if, for example, when the number of the pattern corresponding to the button operated by the user is 1, the control unit 2 reads the image forming information of pattern number 1, that is, one set of fold line data and pattern data, from the pattern table 30, and transfers the same to the image forming unit 7 to create the paper shown in FIG. 4A on which the image based on one set of fold line data and pattern data is formed.

The fold line data (folding procedure image data) is the image data for forming the fold line image on a paper showing the folding procedure (fold line and way of folding) for folding the paper. Further, the pattern data (pattern image forming data) is the image data for forming a predetermined pattern image at a predetermined position of a paper folded according to the image showing the folding procedure formed on the paper based on the fold line data of the same pattern number. In the paper shown in FIG. 4A, the fold line image based on the fold line data is also formed along with the pattern image based on the pattern data included in one set of image forming information. However, the pattern image based on the pattern data and the fold line image based on the fold line data included in one set of image forming information may each be formed on a separate piece of paper. In this case, even if a third person obtains the paper formed only with the pattern image based on the pattern data, such paper does not have the fold line image formed thereon, and thus the third person is unable to know the proper way of folding. Therefore, spoofing by the third person who obtained the paper formed only with the pattern image is prevented.

The user who has obtained the paper formed with an image as shown in FIG. 4A can create the paper of a shape shown in FIG. 4B by folding the paper according to the folding procedure (fold line and way of folding) shown by the fold line image formed on the paper. The paper created in this way may be used for inputting authentication information when authentication and the like are executed. Specifically, when the user is requested for authentication when using the MFP 1, the user places the paper as shown in FIG. 4A in a state folded into the shape shown in FIG. 4B on the document platen and operates the start button. The MFP 1 transfers the image data, obtained by reading the paper folded into the state shown in FIG. 4B with the image reading unit (reading means) 8, to the recognizing unit 4.

Figure 5:
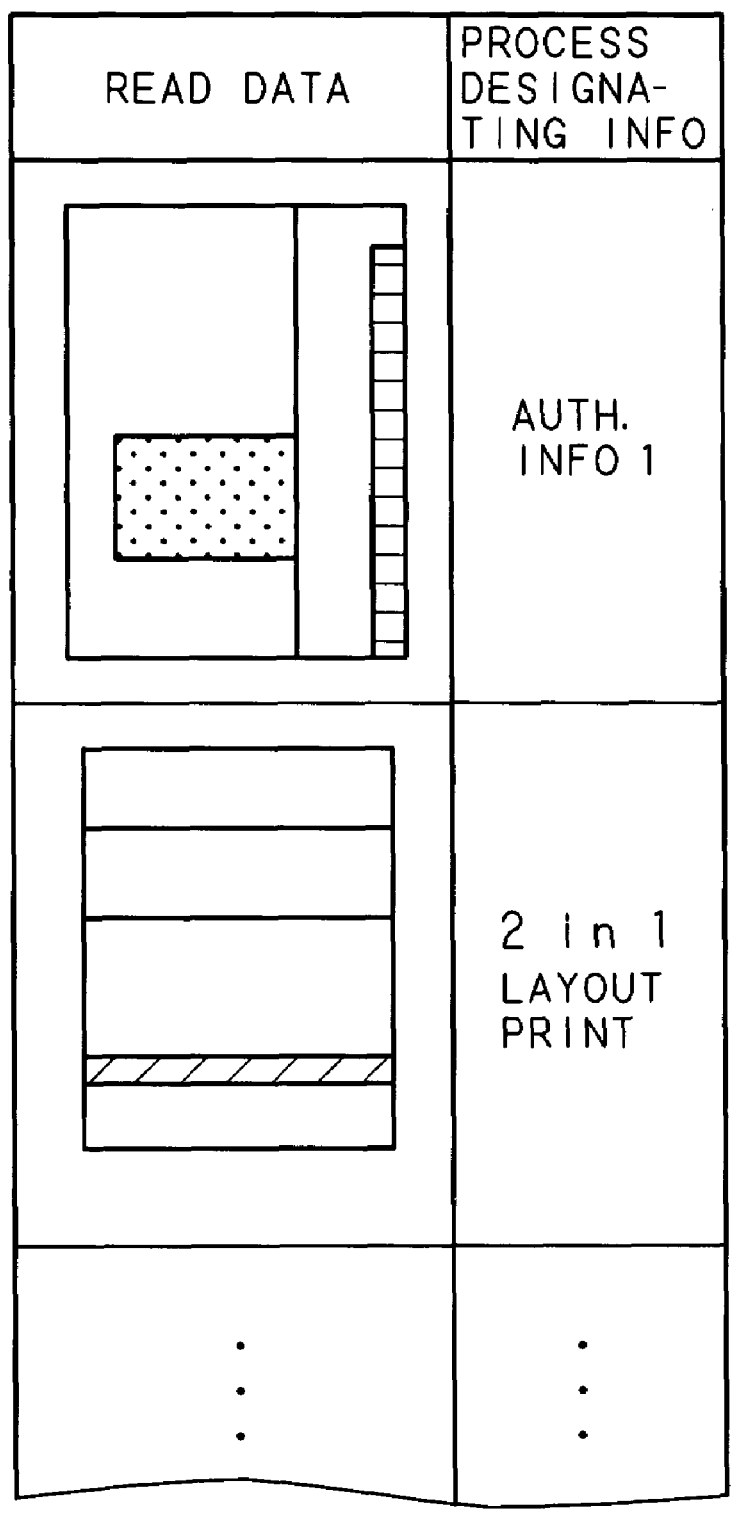
FIG. 5 is a schematic diagram showing a configuration example of an information table.

The recognizing unit 4A has a non-volatile storage unit. The storage unit stores an information table 40 (processing information storing means) as shown in FIG. 5. The information table 40 stores the read data consisting of the shape of the paper and the image data obtained from the image formed on the relevant paper, and the process designating information corresponding to each read data. The recognizing unit 4 also functions as detecting means for detecting the shape of the paper to be read based on the image data transferred from the image reading unit 8. Therefore, the recognizing unit 4 is able to extract the corresponding process designating information from the information table 40 based on the shape of the paper detected by itself and the image data transferred from the image reading unit 8. Further, the recognizing unit 4 transfers the extracted process designating information to the authenticating unit 5 or the setting unit 6 depending on whether the extracted process designating information is authentication information or various setting conditions. In a case where the process designating information corresponding to the shape of the paper detected by the recognizing unit 4 and the image data transferred from the image reading unit 8 is not stored in the information table 40, the recognizing unit 4 does not output any information, and the various processes based on the process designating information stored in the information table 40 are not executed. Thus, the various processes are executed only when the user makes the image reading unit 8 read the paper of a predetermined shape formed with the predetermined image, and in other cases, the execution of various processes is restricted.

The authenticating unit 5 stores, in advance, the authentication data used in user authentication appropriately executed during the operation of the MFP 1. Authentication numbers made up of plural digits of numbers are, for example, used as the authentication data. The authenticating unit 5 functions, when the process designating information indicating the authentication information is transferred from the recognizing unit 4, as processing means for determining whether the obtained authentication information and the pre-stored authentication data match or not, and when they match, authenticating the user as a legitimate user.

The setting unit 6 operates, when the process designating information indicating the various setting conditions is transferred from the recognizing unit 4, as processing means for executing setting processes based on the setting conditions indicated in the process designating information that has been transferred. In the present embodiment, the recognizing unit 4, the authenticating unit 5, and the setting unit 6 are separately provided as hardware, but the control unit 2 may execute the processes of each of the recognizing unit 4, the authenticating unit 5, and the setting unit 6 according to the appropriate computer program.

Figure 6:
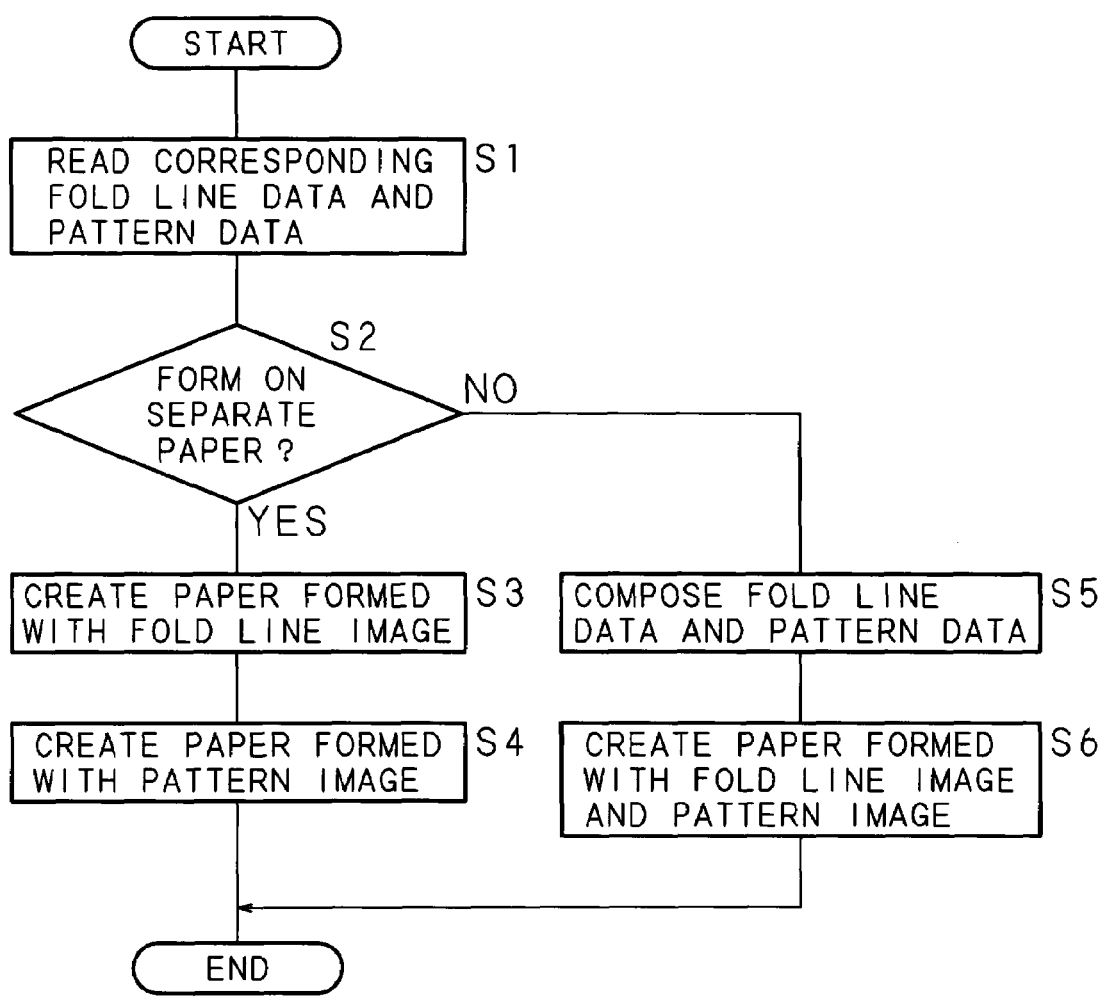
FIG. 6 is a flow chart showing procedures of the process for creating the paper from the MFP.

The creating processes of the setting paper or the authentication paper by the MFP 1 configured as above will now be explained. FIG. 6 is a flow chart showing the procedures for the creating process of the setting paper or the authentication paper by the MFP 1 according to the present embodiment. The control unit 2 controls the following processes according to the program stored in the ROM built in the control unit 2.

In the MFP 1 during the normal operation, the standby screen shown in FIG. 2 is displayed on the displaying unit 112 of the user interface 11. The user operates the "create setting paper" button 11a or the "create authentication paper" button 11b by way of the operating unit 111 also used as the displaying unit 112. Thus, when the creating process of the paper formed with a predetermined fold line image and the pattern image is accepted, the image data generating unit 3 of the control unit 2 reads the fold line data and the pattern data corresponding to the button operated by the user from the pattern table 30, whose one example of the storage content is shown in FIG. 3 (S1).

The control unit 2 then determines whether the user specifies to form the image of the fold line data and the pattern data each on a different paper (S2). When determined to be specified to form images each on a different paper (S2: YES), the control unit 2, by transferring only the fold line data to the image forming unit 7, creates the paper formed only with the fold line image based on the fold line data. Thereafter, the control unit 2, by transferring only the pattern data to the image forming unit 7, creates the paper formed only with the pattern image based on the pattern data (S4).

When determined that the fold line data and the pattern data are not specified to be formed as an image on a separated paper (S2: NO), that is, when specified to form the images of the fold line data and the pattern data on the same paper, the control unit 2 composes the fold line data and the pattern data (S5), and transfers the composite data to the image forming unit 7. Thus, the control unit 2 creates a paper formed with both the fold line image based on the fold line data and the pattern image based on the pattern data (S6).

As described above, the paper created by making the user operate the "create setting paper" button 11a and the "create authentication paper" button 11*b* is used, for example, for inputting various setting conditions, and for inputting authentication information used in authentication. Therefore, by folding the paper according to the fold line image formed on the paper and placing the paper on the document platen of the image reading unit 8 for read processing, the user can input the various setting conditions or authentication information without operating the operating unit 111 of the user interface 11.

Figure 7:
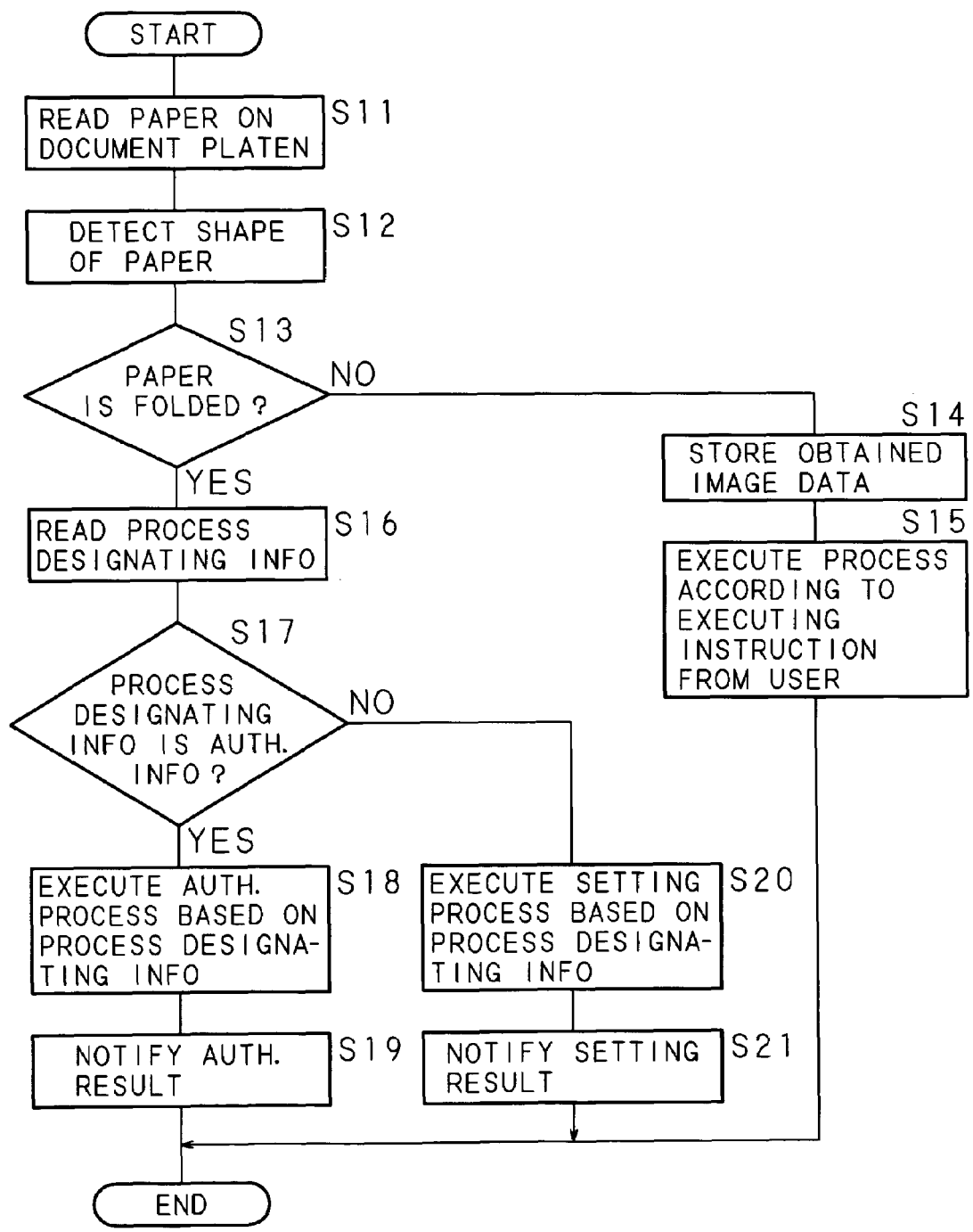
FIG. 7 is a flow chart showing an input processing procedure using the paper from the MFP.

The input processes of the various setting conditions or the authentication information using the created paper as mentioned above will now be explained. FIG. 7 is a flow chart showing the procedures for the input process by the MFP 1 according to the present embodiment using the paper created mentioned above. The following processes are controlled by the control unit 2 according to the program stored in the ROM built in the control unit 2.

In the MFP 1 during the normal operation, the reading process starts when the user places the paper folded into a predetermined shape on the document platen and operates the start button of the operating unit 111. The control unit 2 makes the image reading unit 8 read the paper placed on the document platen (S11), and transfers the obtained image data to the recognizing unit 4. The recognizing unit 4 operates according to the instruction from the control unit 2, and detects the shape of the paper to be read based on the image data obtained by the image reading unit 8 (S12).

The recognizing unit 4 first determines whether the paper to be read is folded or not based on the detected shape (S13). When determined to be not a folded paper (S13: NO), that is, when instructed of the execution of the normal copying process, facsimile transmission process or the network transmission process and the like, the recognizing unit 4 stores the image data obtained by the image reading unit 8 in the storage unit 10 (S14). Further, the control unit 2 transfers the image data stored in the storage unit 10 to the image forming unit 7, the communication unit 9 or the network interface 12 according to the executing instruction from the user to execute the respective process (S15).

When, determined that the paper to be read is folded (S13: YES), the recognizing unit 4 reads the corresponding process designating information from the storage content of the information table 40 shown in FIG. 5 based on the detected shape and the image data transferred from the image reading unit 8 (S16). Next, the recognizing unit 4 determines whether the process designating information read from the information table 40 is the authentication information or not (S17). When determined that the process designating information read from the information table 40 is the authentication information (S17: YES), the recognizing unit 4 inputs the process designating information read from the information table 40 to the authenticating unit 5. The authenticating unit 5 executes the authentication process based on the process designating information inputted from the recognizing unit 4 (S18), and notifies the executed authentication result to the user by displaying it on the displaying unit 112 of the user interface 11 (S19).

When determined that the process designating information read from the information table 40 is not the authentication information (S17: NO), that is, when determined as being one of the various setting conditions, the recognizing unit 4 inputs the process designating information read from the information table 40 to the setting unit 6. The setting unit 6 executes the setting process based on the process designating information inputted from the recognizing unit 4 (S20), and notifies the setting result of the executed setting process to the user by displaying it on the displaying unit 112 of the user interface 11 (S21).

As mentioned above, in the MFP 1 of the present embodiment, input of the various setting conditions and input of the authentication information for use in authentication may be executed based on the image data obtained by reading the paper which is created by folding a paper formed with a predetermined pattern image into a predetermined shape, and the shape of the paper. Therefore, the user does not need to perform the complicating operation of the user interface 11 and further, does not need to separately arrange an apparatus such as a barcode reader and the like in the MFP 1.

In the above described input processes, the recognizing unit 4 detects the shape of the paper to be read based on the image data transferred from the image reading unit 8, but does not necessarily need to detect the shape of the paper. That is, it may be configured so as to specify the corresponding process based only on the image data read from the paper by the image reading unit 8. Further, when the operation button operated by the user when performing input of setting conditions of the user interface 11 or input of the authentication information is arranged and each operation button is operated, it is configured so as to specify the corresponding process based on the operated operation button and the image data read by the image reading unit 8 at that time.

Further, as described above, the image for creating the paper that can be used for input of various setting conditions and the authentication information is not limited to the fold line image and the pattern image shown in FIG. 3 and FIG. 4A, FIG. 4B. For example, it may be the fold line image and the pattern image shown in FIG. 8A and FIG. 8B to FIG. 11A and FIG. 11B. In FIG. 8A and FIG. 8B to FIG. 11A and FIG. 11B, the paper formed with the fold line image and the pattern image each based on different data is shown in a schematic diagram.

Figure 8A:
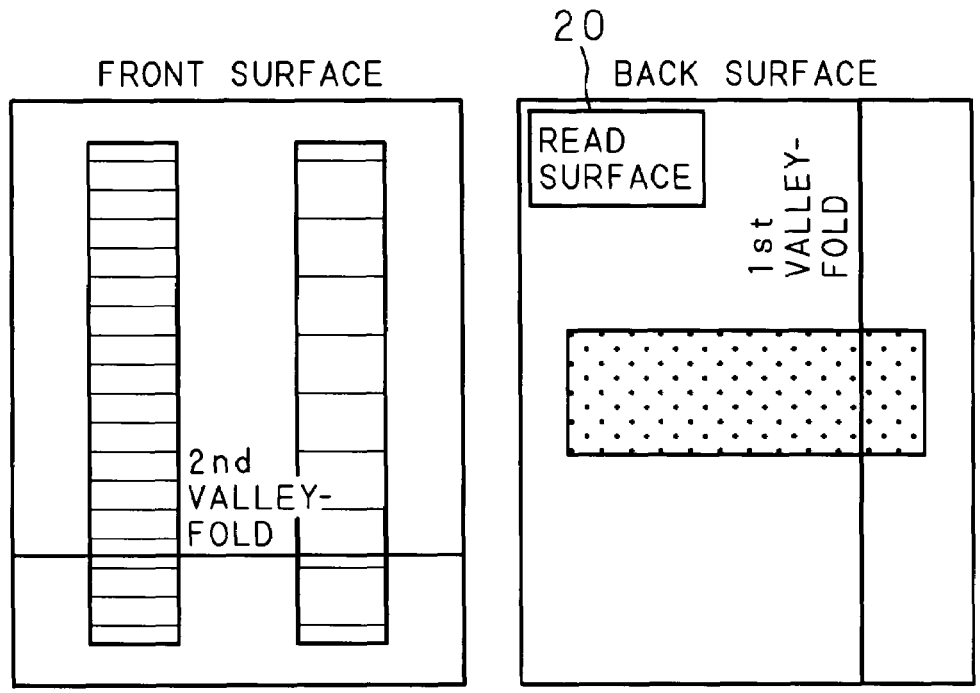
FIG. 8A and FIG. 8B are schematic diagrams showing examples of a fold line and a pattern formed on the paper.
Figure 8B:
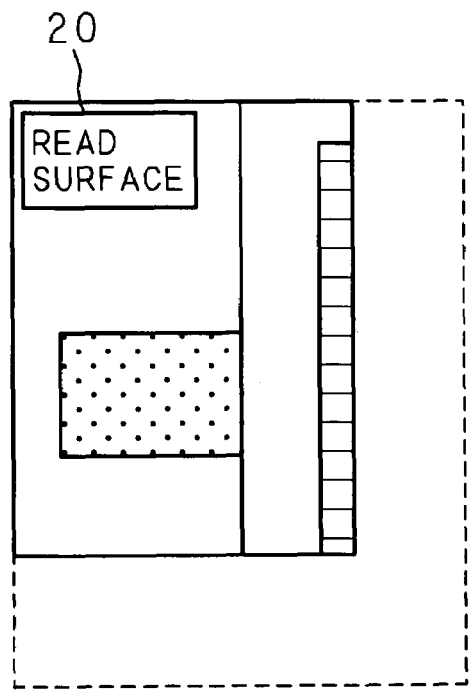

In the paper shown in FIG. 8A and FIG. 8B, an image 20 showing the read surface is formed in addition to the images based on the fold line data and the pattern data of pattern number 1 in the pattern table 30 shown in FIG. 3. Therefore, when the paper shown in FIG. 8A is folded according to the fold line image, the paper shown in FIG. 8B is created. The user places the paper on the document platen with the image 20 showing the read surface as the reading surface and executes the reading process to input the setting conditions or the authentication information corresponding to the created paper.

Figure 9A:
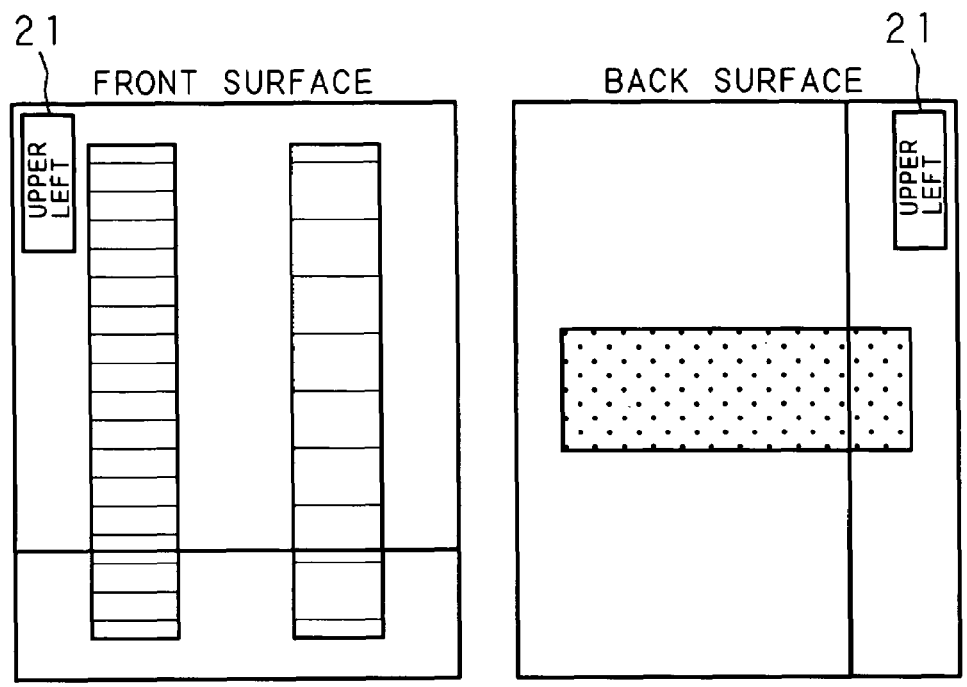
FIG. 9A and FIG. 9B are schematic diagrams showing an example of a fold line and a pattern formed on the paper.
Figure 9B:
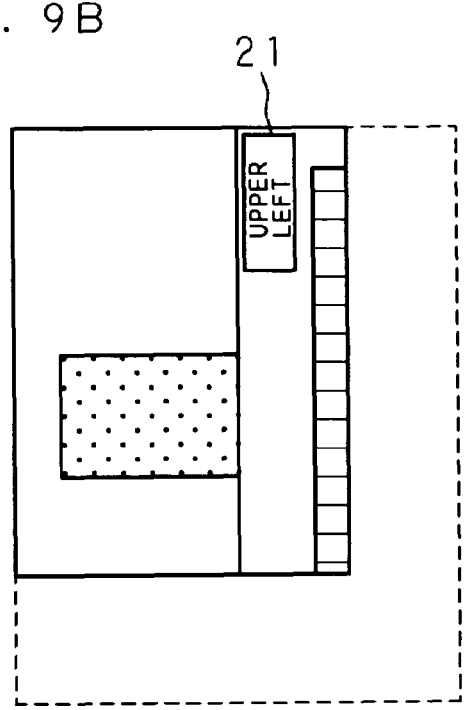

In the paper shown in FIG. 9A and FIG. 9B, in addition to the images based on the fold line data and the pattern data of pattern number 1 in the pattern table 30 shown in FIG. 3, an image 21 indicating the read surface and the direction of placing on the document platen is formed. Therefore, when the paper shown in FIG. 9A is folded according to the fold line image, the paper shown in FIG. 9B is created. The user places the paper on the document platen according to the placement direction shown by the image 21 and executes the reading process to input the setting condition or the authentication information corresponding to the created paper.

As shown in FIG. 8A, FIG. 8B and FIG. 9A, FIG. 9B, when the direction of the read surface and the placement direction on the document platen are clearly shown on the paper, the placement direction on the document platen becomes clear. Therefore, each user who has obtained the paper formed with the fold line image and the pattern image can easily place the document on the document platen in the correct direction, and thus the input of the setting condition or the authentication information corresponding to the placed paper is reliably executed.

Figure 10A:
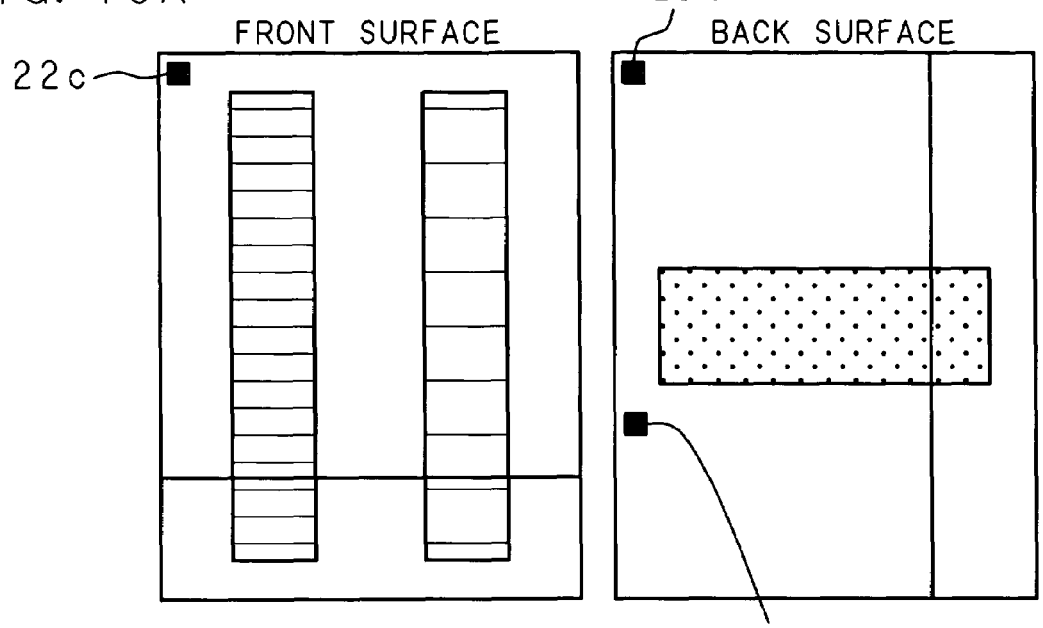
FIG. 10A, FIG. 10B and FIG. 10C are schematic diagrams showing examples of a fold line and a pattern formed on the paper.
Figure 10B:
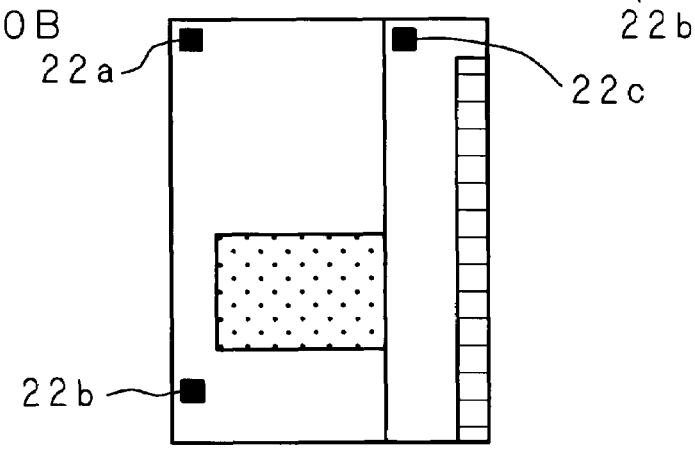
Figure 10C:
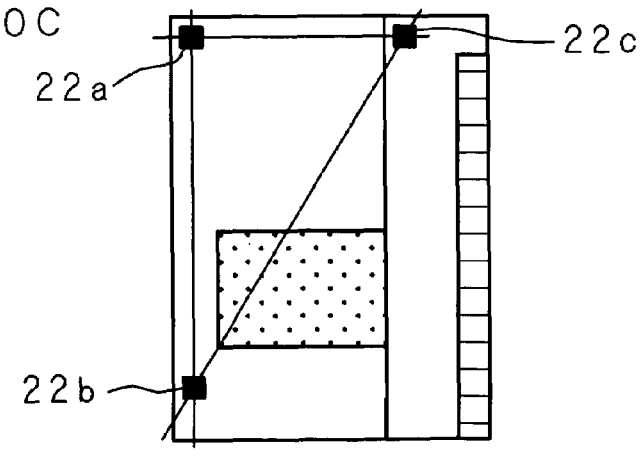

In the paper shown in FIG. 10A, FIG. 10B, and FIG. 10C, in addition to the images based on the fold line data and the pattern data of pattern number 1 in the pattern table 30, three images 22a, 22b, and 22c indicating the direction of the paper are formed. Therefore, when the paper shown in FIG. 10A is folded according to the fold line image, the paper shown in FIG. 10B is created. When such paper is the subject of reading, the recognizing unit 4 detects the positions of each of the images 22a, 22b, and 22c from the image data obtained by the image reading unit 8 and obtains three straight lines each connecting each detected position.

The recognizing unit 4 specifies the position where two straight lines out of the obtained three straight lines are orthogonal and defines the image (image 22a in FIG. 10C) of the specified position as a base point. Further, when the base point is at the upper left corner portion, the recognizing unit 4 executes image processing for rotating the image data obtained from the image reading unit 8 so that the specified base point places at the upper left corner portion. The recognizing unit 4 detects the shape of the paper to be read based on the rotated image data, and reads the process designating information corresponding to the shape of the detected paper and the rotated image data from the information table 40. Input of the setting condition or the authentication information is executed based on the process designating information read in this way. A control program for the recognizing unit 4 for executing each of the above processes is stored in advance in the recognizing unit 4.

Figure 11A:
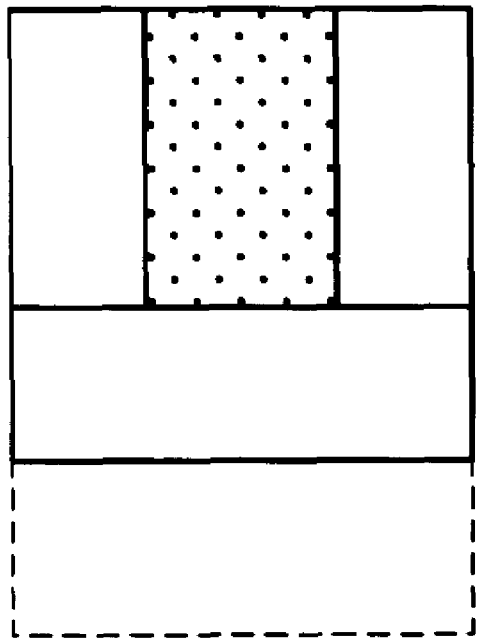
FIG. 11A and FIG. 11B are schematic diagrams showing examples of a fold line and a pattern formed on the paper.
Figure 11B:
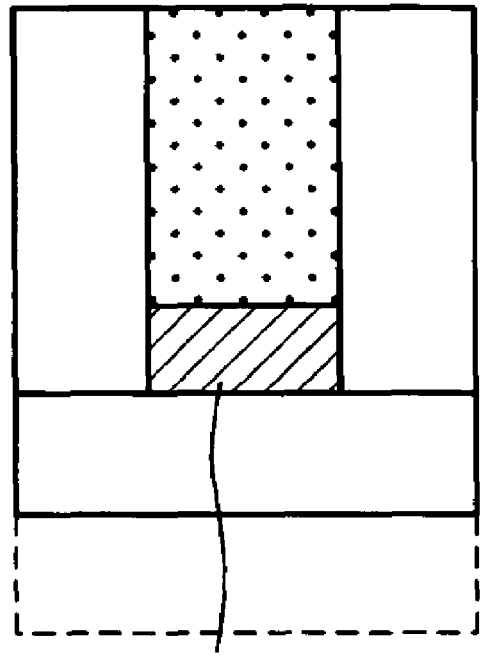

In the paper shown in FIG. 11A and FIG. 11B, when folded in a proper way, only the pattern image as shown in FIG. 11A appears on the read surface but when folded in the wrong way, the pattern image in which the unnecessary image (non-permitted information) shown with a reference numeral 23 in FIG. 11B appears on the read surface is formed. When such paper is used, even if a third person who does not have the appropriate usage authority obtains the paper, the third person may not be able to fold the paper in the proper way. Therefore, even if the paper itself is correct, the input of various information is prohibited and the user is not authenticated as the legitimate user when the paper is folded in the wrong way, and thus the security of the MFP 1 is enhanced.

The fold line data and the pattern data for creating the above mentioned paper may be arbitrarily created by the operation of the user interface 11 by the user. The generating process of the fold line data and the pattern data will now be explained. The user operates a predetermined operation button of the user interface 11 when desiring to add a new pattern image to the pattern table 30. Accordingly, the control unit 2 of the MFP 1 displays the registration screen as shown in FIG. 12A to FIG. 12D on the displaying unit 112 of the user interface 11. The displaying unit 112 also functions as the operating unit 111 of touch panel type, and the operating unit 111 functions as each accepting means, that is, folding procedure accepting means, pattern selection accepting means, and position accepting means.

Figure 12A:
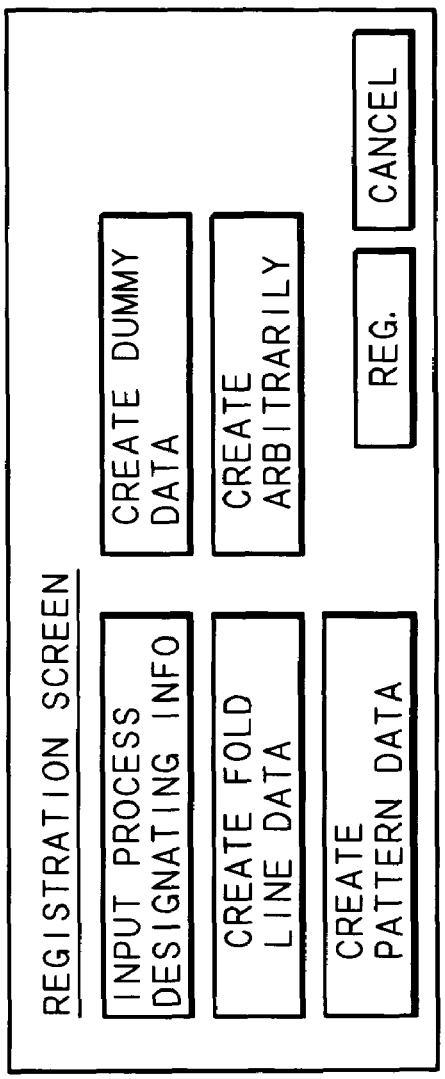
FIG. 12A, FIG. 12B, FIG. 12C and FIG. 12D are schematic diagrams showing examples of a registration screen.

The registration screen is configured so as to be able to select any one of "input process designating information" for specifying the process designating information of the process to execute using the paper configured by the fold line image, the pattern image, and the dummy image (non-permitted information), or information to input and the like, "create fold line data" for specifying the fold line image, "create pattern data" for specifying the pattern image, "create dummy data" for specifying the dummy image, and "create arbitrarily" for arbitrarily creating the paper by specifying the paper in the folded state, as shown in FIG. 12A.

When the user selects "input process designating information", the control unit 2 displays the process designating information input screen (not shown) that allows selection of various setting conditions and input of the arbitrary authentication information in the MFP 1. The user selects the setting condition to register to the pattern table 30 or inputs the arbitrary authentication information according to the instruction of the process designating information input screen. The control unit 2 thus temporarily stores the input setting condition or the authentication information to its RAM and again displays the registration screen shown in FIG. 12A on the user interface 11.

Figure 12B:
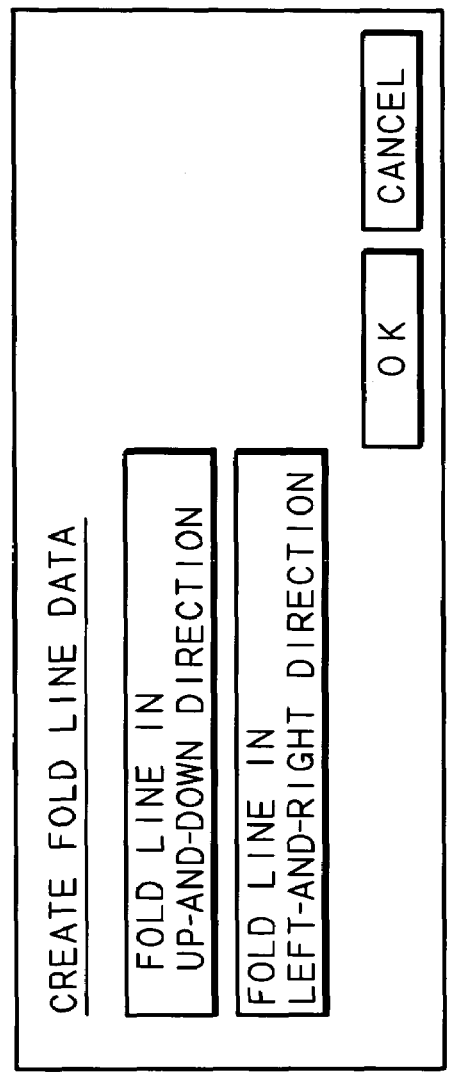

When the user selects "create fold line data" in the registration screen shown in FIG. 12A, the control unit 2 displays the fold line data creation screen as shown in FIG. 12B. The fold line data creation screen is configured to create each of "fold line in up-and-down direction" and "fold line in left-and-right direction". When the user selects "fold line in up-and-direction", the control unit 2 displays the fold line data creation screen in the up-and-down direction shown in FIG. 12C. In the fold line data creation screen in the up-and-down direction, the specification of the distance from the left edge of the paper to the desired fold line, and valley-fold or mountain-fold is specified when the paper of, for example, A4 size is used in inputting various setting conditions and authentication information as described above.

Figure 12C:
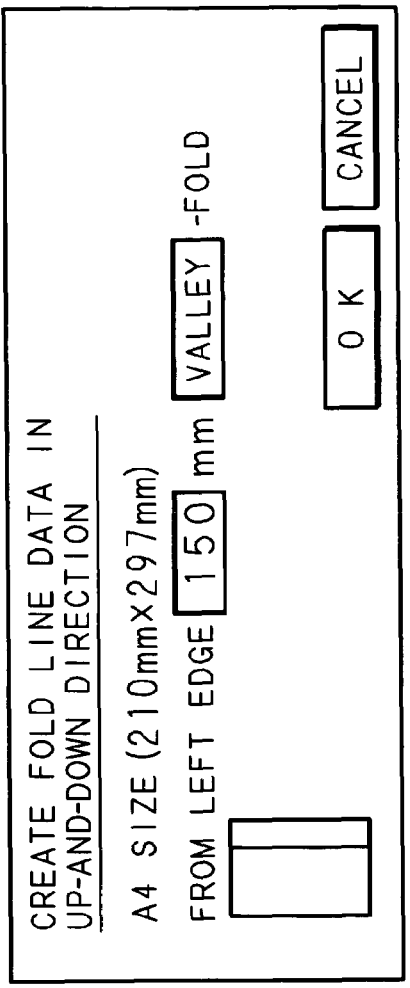

When the user operates the OK button after above mentioned input, the control unit 2 temporarily stores the setting related to the specified fold line image in its RAM, and again displays the fold line data shown in FIG. 12B on the user interface 11. By selecting "fold line in the left-and-right direction" when the user desires to also generate the fold line in the left-and-direction, the left-and-right fold line data creation screen (not shown) in which only one part of the up-and-down fold line data creation screen shown in FIG. 12C is changed for the up-and-down direction is displayed. The user specifies the distance from the upper edge of the paper to the desired fold line and valley-fold or mountain-fold according to the left-and-right fold line data creating screen and operates the OK button. In this case, the control unit 2 temporarily stores the setting related to the specified fold line image in its RAM and displays the registration screen shown in FIG. 12A on the user interface 11.

Figure 12D:
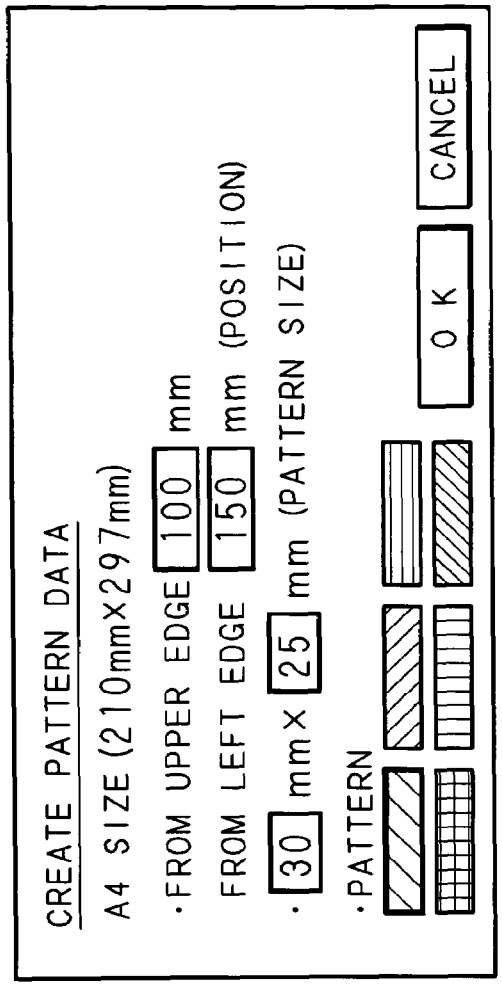

When the user selects "create pattern data" in the registration screen shown in FIG. 12A, the control unit 2 displays the pattern data creation screen as shown in FIG. 12D. In the pattern data creation screen, by specifying the distance from the upper edge and the distance from the left edge, the base point for arranging the pattern image, the size of the pattern image arranged with the base point as the base, and the type of the arranged pattern image are specified with respect to the A4 size. When the user operates the OK button after above mentioned input, the control unit 2 temporarily stores the setting related to the specified pattern image to its RAM, and again displays the registration screen shown in FIG. 12A on the user interface 11. The data representing the pattern itself of each pattern image is stored in advance in the pattern table 30 (pattern image storing means) of the storage unit 10.

When the user selects "create dummy data" in the registration screen shown in FIG. 12A, the control unit 2 displays the dummy data creation screen (not shown) similar to the pattern data creation screen shown in FIG. 12D. The user is able to input the specification related to the dummy image similar to the pattern image. Further, when the user operates the OK button after inputting the specification related to the dummy image, the control unit 2 temporarily stores the setting of the set dummy image in its RAM, and again displays the registration screen shown in FIG. 12A on the user interface 11. The processes at selecting "create arbitrarily" in the registration screen shown in FIG. 12A will be described later.

When the "registration" button in the registration screen shown in FIG. 12A is operated under condition where the process designating information and at least one setting of the fold line image, the pattern image, and the dummy image input, the control unit 2 gives the input setting of the setting of the fold line image, the setting of the pattern image, and the setting of the dummy image temporarily stored in the RAM to the image data generating unit 3. The image data generating unit 3 generates the image data (fold line data, that is, folding procedure image data, and pattern data, that is, pattern forming image data) for forming the image according to the given setting on the paper. The control unit 2 registers the image data generated by the image data generating unit 3 and the process designating information temporarily stored in the RAM of the control unit 2 in the pattern table 30 as one set of processing information. Simultaneously, the control unit 2 transfers, to the image forming unit 7, the data registered in the pattern table 30 out of the fold line data, the pattern data, and the dummy data, in order to execute image forming thereby creating the paper formed with the image based on each newly registered data.

The user folds the paper formed with the image based on each newly registered above mentioned data thereon according to the folding procedure shown by the fold line image and places the paper on the document platen of the image reading unit 8 and starts the reading process. The control unit 2 transfers the image data obtained in the image reading unit 8 and the process designating information registered in the pattern table 30 as above to the recognizing unit 4. The recognizing unit 4 detects the shape of the paper to be read based on the image data obtained by the image reading unit 8, and registers the detected shape and the obtained image data in the information table 40 shown in FIG. 5 in correspondence with the process designating information transferred from the control unit 2.

Figure 13:
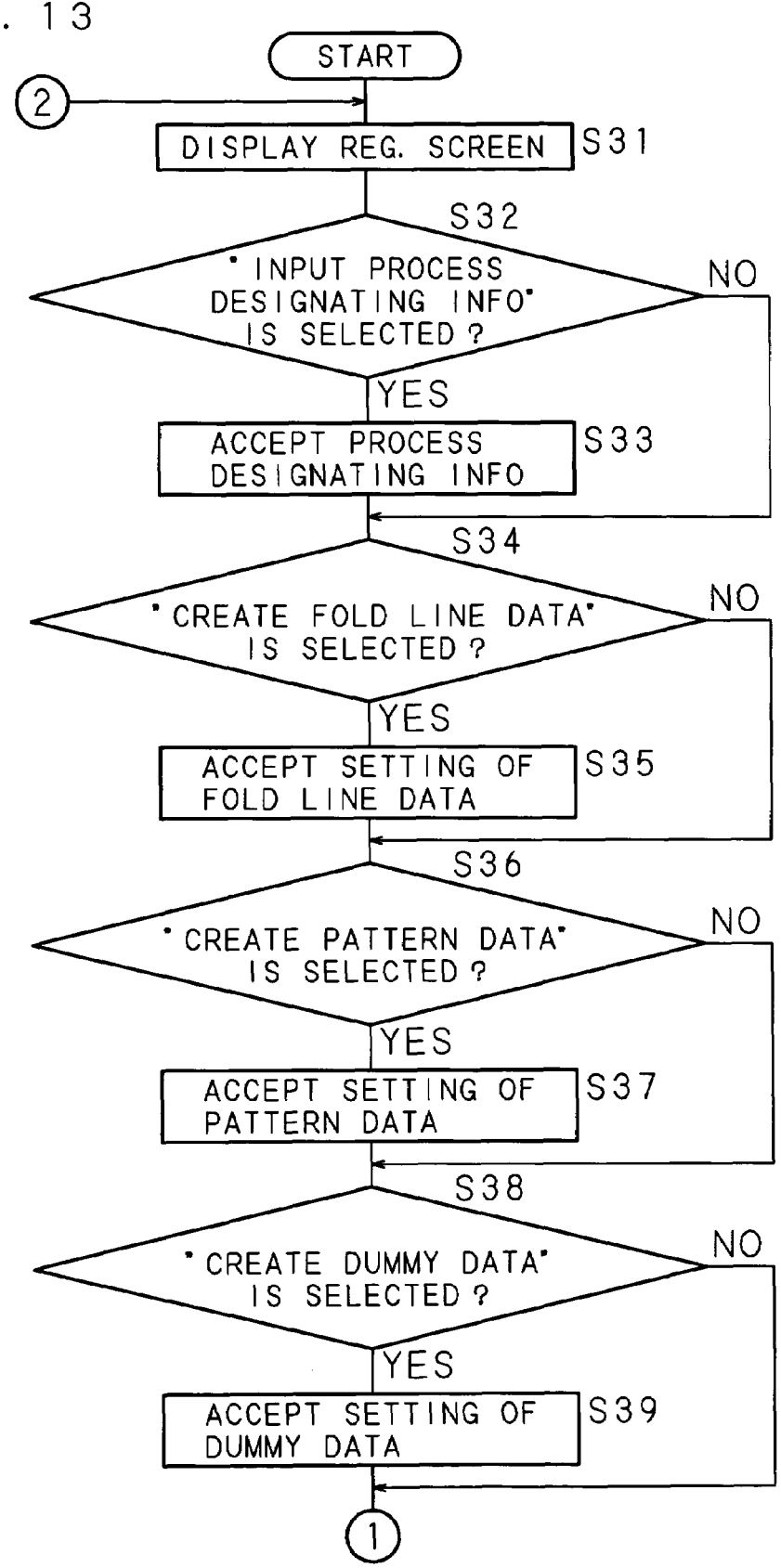
FIG. 13 is a flow chart showing procedures of the process for generating the pattern data by the MFP.
Figure 14:
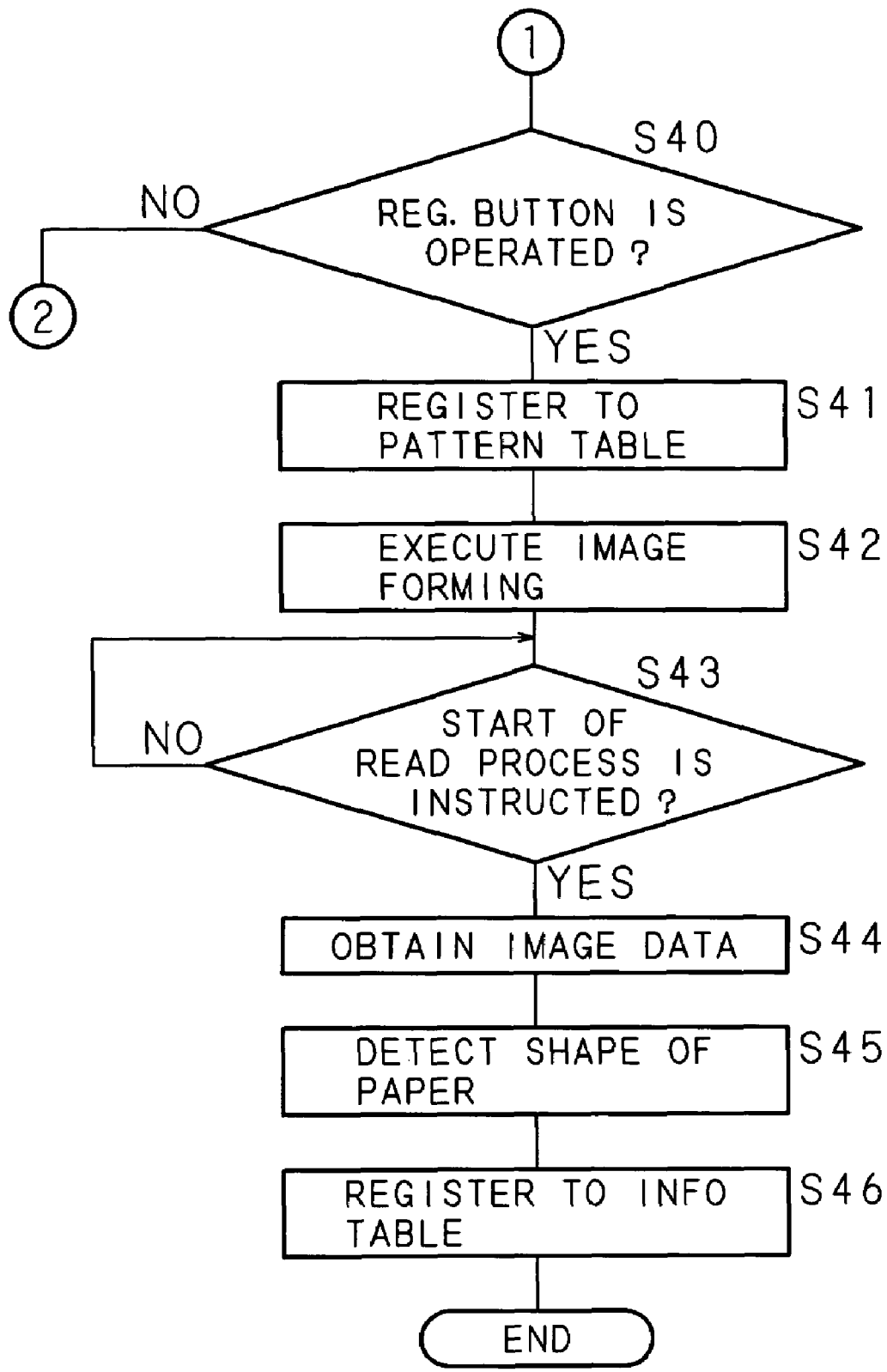
FIG. 14 is a flow chart showing procedures of the process for generating the pattern data by the MFP.

The registration process of the arbitrary fold line data and the pattern data described above will now be specifically explained with reference to the flow chart. FIG. 13 and FIG. 14 are flow charts showing the procedures of the generating process of an arbitrary pattern data by the MFP 1 according to the present embodiment. The following processes are controlled by the control unit 2 according to the program stored in the ROM built in the control unit 2.

When the user operates a predetermined operation button displayed on the displaying unit 112 of the user interface 11 to add a new pattern image to the pattern table 30 stored in the image data generating unit 3, the control unit 2 displays the registration screen as shown in FIG. 12A on the user interface 11 (S31). The control unit 2 determines whether the user has selected "input process designating information" or not in the registration screen shown in FIG. 12A (S32). When determined that "input process designating information" has been selected (S32: YES), the control unit 2 accepts the process designating information inputted by the user according to the process designating information input screen displayed on the user interface 11 (S33).

The control unit 2 skips the process of step S33 when determined that "input process designating information" is not selected (S32: NO), and determines whether the user has selected "create fold line data" in the registration screen shown in FIG. 12A (S23). When determined that "create fold line data" has been selected (S34: YES), the control unit 2 accepts the setting of the fold line image inputted by the user according to the fold line data creation screen displayed on the user interface 11 (S35).

Further, when determined that "create fold line data" is not selected (S34: NO), the control unit 2 skips the process of step S35 and determines whether the user has selected "create pattern data" in the registration screen shown in FIG. 12A (S36). When determined that "create pattern data" has been selected (S36: YES), the control unit 2 accepts the setting of the pattern image inputted by the user according to the pattern data creation screen displayed on the user interface 11 (S37).

When determined that "create pattern data" is not selected (S36: NO), the control unit 2 skips the process of step S37, and determines whether the user has selected "create dummy data" in the registration screen shown in FIG. 12A (S38). When determined that "create dummy data" has been selected (S38: YES), the control unit 2 accepts the setting of the dummy data inputted by the user according to the dummy data creation screen displayed on the user interface 11 (S39).

When determined that "create dummy data" is not selected (S38: NO), the control unit 2 skips the process of step S39, and determines whether the user has operated the registration button in the registration screen shown in FIG. 12A (S40). When determined that the registration button has not been operated (S40: NO), the control unit 2 returns the process to step S31 and continues to display the registration screen shown in FIG. 12A.

When determined that the registration button has been operated by the user (S40: YES), the control unit 2 gives the setting of the fold line image, the setting of the pattern image, and the setting of the dummy image, each accepted as described above, to the image data generating unit 3 to generate the image data for forming the image on the paper according to the given setting. The control unit 2 registers the image data generated by the image data generating unit 3 and the process designating information to the pattern table 30 as one set of process information (S41). The control unit 2 then transfers the fold line data, the pattern data, and the dummy data registered in the pattern table 30 to the image forming unit 7 and executes the image forming (S42). As a result, the paper formed with the image based on each newly registered data is created.

The user folds the paper formed with the image based on each newly registered data according to the folding procedure indicated by the fold line image, places the paper on the document platen and operates the start button to instruct the start of the reading process. The control unit 2 determines whether start of reading process is instructed or not by the user (S43). When the start of reading process is not instructed (S43: NO), the control unit 2 waits until the start of reading process is instructed.

When determined that the start of reading process is instructed (S43: YES), the control unit 2 obtains the image data by reading the paper placed on the document platen with the image reading unit 8 (S44), and transfers the obtained data to the recognizing unit 4 to make the recognizing unit 4 detect the shape of the paper to be read (S45). The recognizing unit 4 corresponds the detected shape and the image data obtained from the image reading unit 8 with the process designating information accepted at step S33 and registers it to the information table 40 shown in FIG. 5 (S46). As a result, the paper formed with the image based on each data newly registered in the pattern table 30 is folded into a predetermined shape and read by the image reading unit 8, so that the user operates the MFP 1 to execute the processes based on the process designating information registered in the information table 40.

The creating process of the fold line data and the pattern data at selecting "create arbitrarily" in the registration screen shown in FIG. 12A will now be explained. When the user selects "create arbitrarily" in the registration screen shown in FIG. 12A, the control unit 2 displays the arbitrary creation screen, as shown in FIG. 15A. The arbitrary creation screen shown in FIG. 15 is configured so as to accept the selection of "input process designating information", "create fold line data", "create pattern data" and "create dummy data", similar to the registration screen shown in FIG. 12A.

Figure 15C:
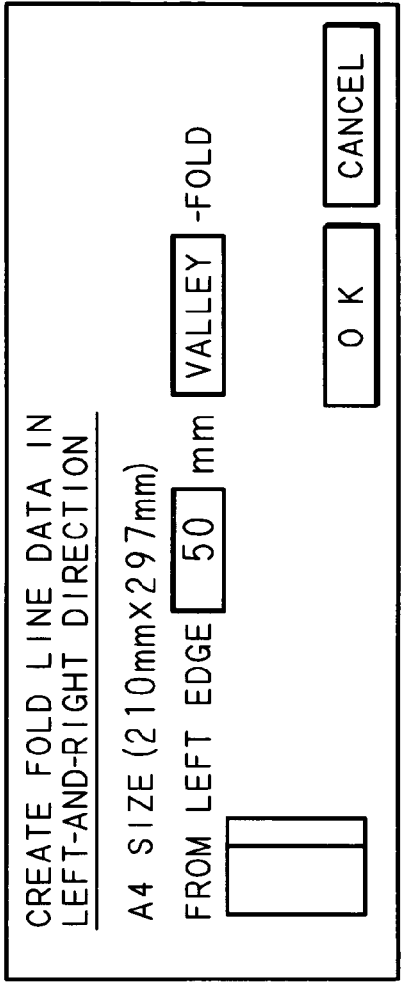
Figure 15D:
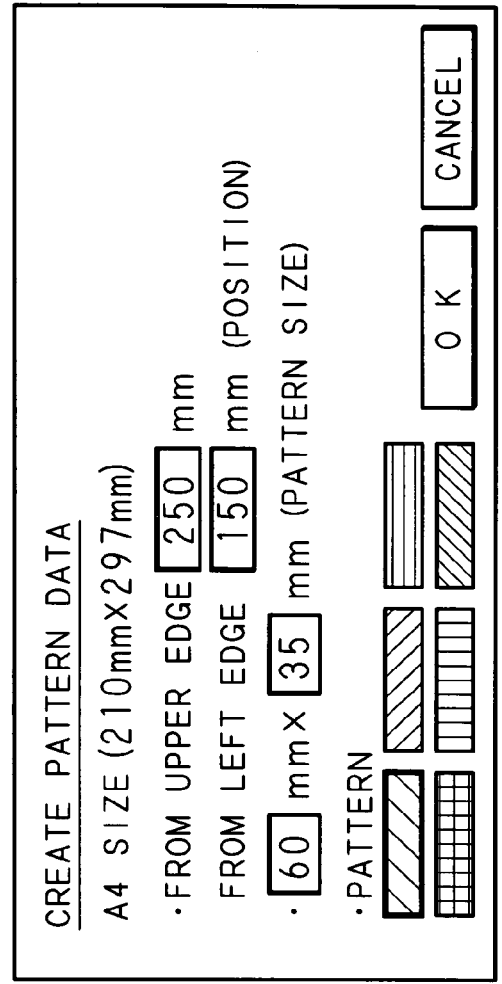

In the arbitrary creation screen shown in FIG. 15A, a paper image 24 showing the state of the paper created based on the setting input according to the fold line data creation screen as shown in FIG. 15B and FIG. 15C, the pattern data creation screen shown in FIG. 15D, the dummy data creation screen (not shown) is also displayed. In addition, in the arbitrary creation screen, when the setting of the fold line image is inputted first, for example, the setting process for forming the pattern image on the paper folded based on the fold line image is executed. Therefore, when the user sets the fold line image and the pattern image shown in FIG. 15B to FIG. 15D, the image based on each setting is formed across the front surface and the folded back surface as shown as the paper image 24 in FIG. 15A.

Figure 16A:
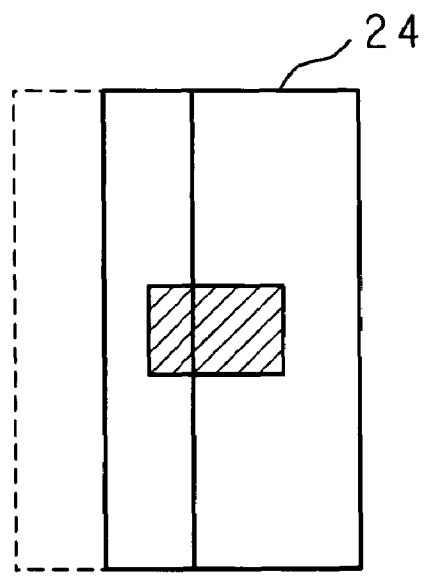
FIG. 16A and FIG. 16B are schematic diagrams explaining the generating process of the pattern data.
Figure 16B:
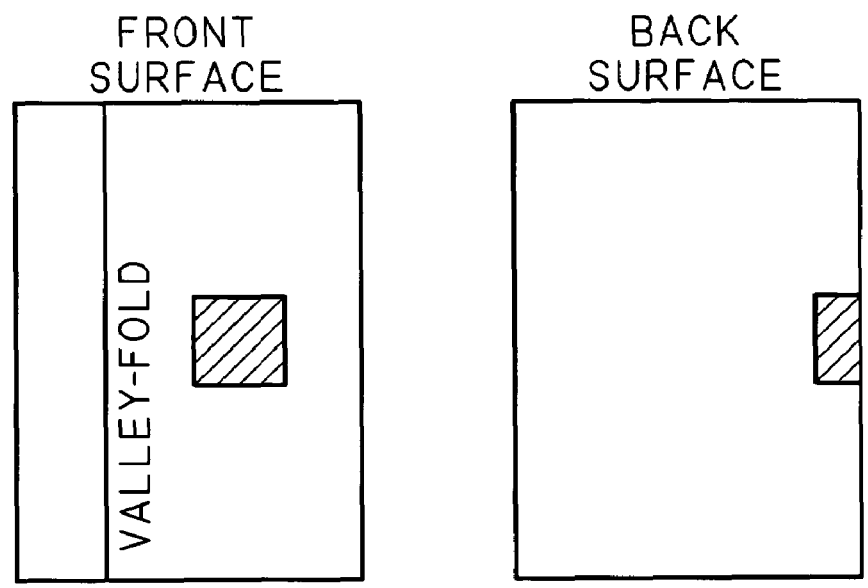

Based on the paper image 24 created by inputting each setting, the control unit 2 makes the image data generating unit 3 generate each data registered in the pattern table 30. Specifically, when "registration" button in the arbitrary creation screen shown in FIG. 15A is operated, the control unit 2 makes the image data generating unit 3 generate the image data as shown in FIG. 16B in which the areas folded according to the fold line image are developed for the paper image 24 shown in FIG. 16A. The control unit 2 corresponds the generated fold line data, the pattern data and the dummy data with the process designating information inputted from the arbitrary creation screen shown in FIG. 15A and registers in the pattern table 30, and also registers the image data of the paper image 24 displayed in the arbitrary creation screen of FIG. 15A and the input process designating information to the information table 40 shown in FIG. 5.

Figure 17:
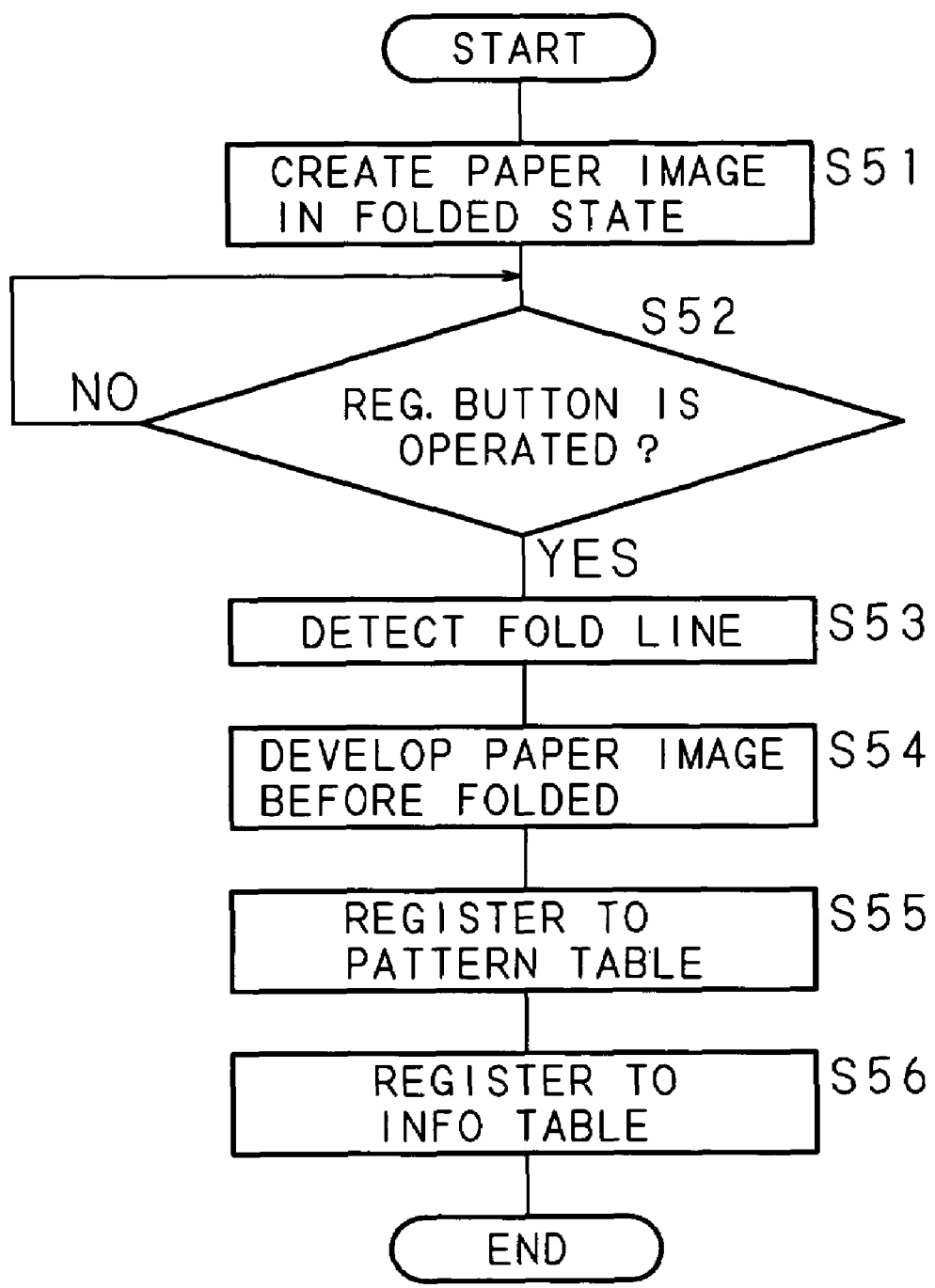
FIG. 17 is a flow chart showing procedures for the process of generating the pattern data by the MFP.

The creating processes of the fold line data and the pattern data at selecting "create arbitrarily" in the registration screen shown in FIG. 12A described above will now be specifically explained with reference to the flow chart. FIG. 17 is a flow chart showing the procedures for the generating process of the arbitrary pattern data by the MFP 1 according to the present embodiment. The following processes are controlled by the control unit 2 according to the program stored in the ROM built in the control unit 2.

In the registration screen shown in FIG. 12A, when the user selects "a create arbitrarily", the control unit 2 accepts each setting of the process designating information, the fold line image, the pattern image, and the dummy image and makes the image data generating unit 3 generate the paper image 24 showing the paper in a folded state by executing the processes similar to steps S31 to S39 of FIG. 13 (S51). The control unit 2 determines whether the user has operated the registration button in the arbitrary creating screen shown in FIG. 15A (S52). When determined that the registration button has not been operated (S52: NO), the control unit 2 becomes waiting state by continuing display of arbitrary creation screen shown in FIG. 15A.

When determined that the registration button has been operated by the user (S52: YES), the control unit 2 makes the image data generating unit 3 detect the fold line in the paper image 24 generated as above (S53), and develop the paper image 24 shown in FIG. 16A to a state before being folded (S54). Based on such result, the control unit 2 makes the image data generating unit 3 generate the image data including the fold line image, the pattern image, and the dummy image as shown in FIG. 16B.

The control unit 2 corresponds the generated fold line data, the pattern data and the dummy data with the process designating information inputted from the arbitrary creation screen shown in FIG. 15A and registers it to the pattern table 30 (S55). Further, the control unit 2 transfers the image data of the paper image 24 displayed on the arbitrary creation screen of FIG. 15A and the input process designating information to the recognizing unit 4, and registers it to the information table 40 shown in FIG. 5 (S56). Thus, as the user folds the paper formed with the image based on each data newly registered to the pattern table 30 into a predetermined shape and makes the image reading unit 8 read the same, the process based on the process instruction information registered in the information table 40 can be executed.

Figure 18:
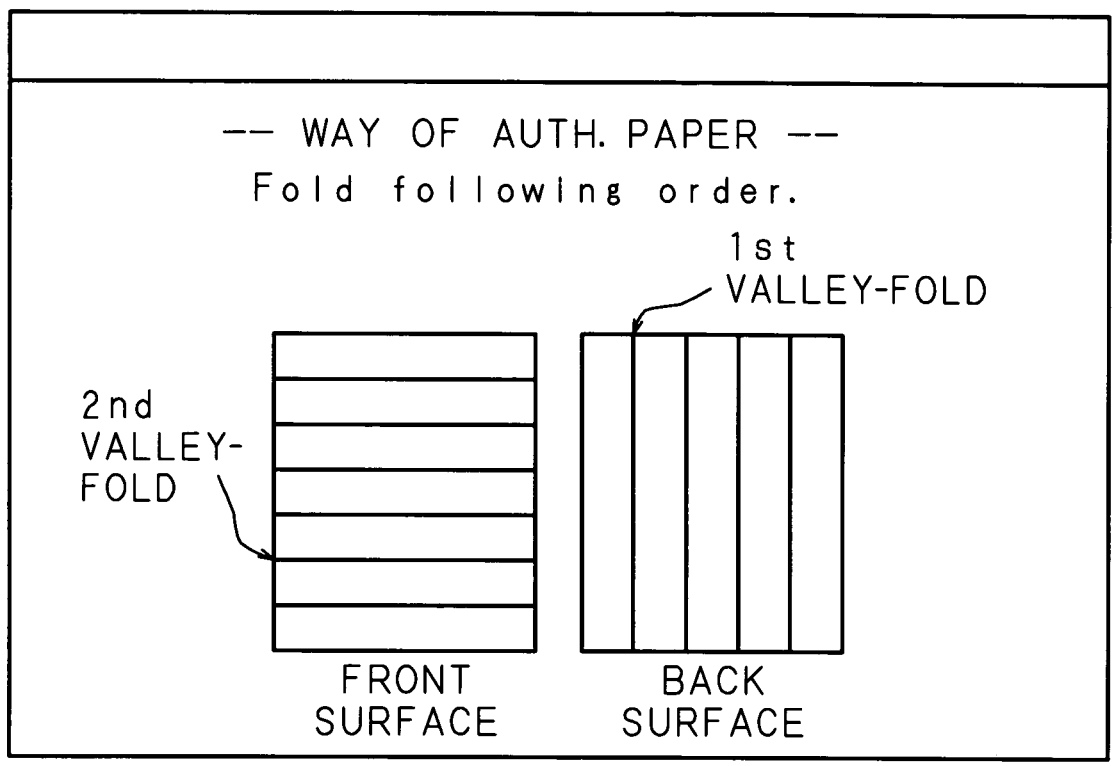
FIG. 18 is a schematic diagram showing an example of a display screen of the fold line data.

In the above embodiment, the case of forming the images based on the fold line data and the pattern data (explanation on dummy data will be omitted) registered in the pattern table 30 each on a different paper, or case of forming the images based on the fold line data and the pattern data on the same paper are explained. However, only the image based on the pattern data may be formed on the paper, and the fold line image based on the fold line data may be displayed on the displaying unit 112 of the user interface 11 as shown in FIG. 18. In this case, the way of folding paper is not formed on the paper as the image, and thus even if the third person obtains the paper formed only with the image based on the pattern data, the correct way of folding is not known. Therefore, execution of various processes by the third person and spoofing by the third person are prevented.

In the above embodiments, when forming various figures, various images, colors, scales and the like on the front and back surface of the paper as the pattern image, various setting conditions and the authentication information may be specified by the relationship between each pattern image, the paper size that changes and the like when the paper is folded. When using the paper formed in advance with the image of a special pattern, specifically, the image of fine pattern having resolution of greater than or equal to 2400 dpi that cannot be reproduced with the current copying machine on the paper formed with the image based on the fold line and the pattern data, the copying of such paper is prevented and enhancement of security is achieved.

Each data stored in the pattern table 30 may be transmitted to an external computer by way of the network 13, as necessary. In this case, each user is able to retain each data in his/her computer, and thus can appropriately form images and create the paper as necessary. In the above embodiments, a configuration of executing input of various setting conditions and input of authentication information used in authentication using the paper formed with a predetermined pattern image and folded to a predetermined shape is explained, but is not limited to such input process and can be applied to various processes.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. An image forming apparatus comprising image forming means for forming an image based on image data on a recording carrier, said image forming apparatus comprising:
　　pattern image storing means for storing plural pattern image data, wherein each of the pattern image data is for forming plural pattern images on a recording carrier;
　　folding procedure accepting means for accepting a folding procedure for folding the recording carrier;
　　pattern selection accepting means for accepting a selection of said plural pattern image data stored in said pattern image storing means;
　　position accepting means for accepting a forming position of an image based on the pattern image data whose selection is accepted by said folding procedure accepting means on the recording carrier folded according to the folding procedure accepted by said folding procedure accepting means; and
　　image data generating means for generating a folding procedure image data for forming an image showing the folding procedure accepted by said folding procedure accepting means on the recording carrier, and pattern forming image data for forming an image based on the pattern image data whose selection is accepted by said pattern selection accepting means at said forming position accepted by said position accepting means on the recording carrier folded according to the folded procedures accepted by said folding procedure accepting means as one set of image forming information, wherein
　　said image forming means forms on the recording carrier an image based on the folding procedure image data and/or the pattern forming image data included in one set of the image forming information generated by said image data generating means.

2. The image forming apparatus as set forth in claim 1, wherein said image forming means forms on one recording carrier the image based on the folding procedure image data and the image based on the pattern forming image data included in one set of the image forming information.

3. The image forming apparatus as set forth in claim 1, further comprising displaying means for displaying the image showing the folding procedure based on the folding procedure image data included in one set of the image forming information, wherein
　　said image forming means forms on the recording carrier said image based on the pattern forming image data of the same set as said folding procedure image data of said image showing the folding procedure displayed on said displaying means.

4. The image forming apparatus as set forth in claim 1, wherein said image forming means forms the image based on the folding procedure image data and the image based on the pattern forming image data included in one set of the image forming information on a different recording carrier.

5. The image forming apparatus as set forth in claim 1, wherein said pattern image data includes directional image data for forming a directional image indicating the up-and-down direction on the recording carrier folded according to the folding procedure shown by the image based on the folding procedure image data.

6. The image forming apparatus as set forth in claim 1, further comprising means for externally transmitting the image forming information.

7. An image forming apparatus comprising image forming means for forming an image based on image data on a recording carrier, said image forming apparatus comprising:
　　image forming information storing means for storing plural sets of image forming information combining folding procedure image data for forming an image showing a folding procedure for folding a recording carrier on the recording carrier, and pattern forming image data for forming an image based on the pattern image data for forming a predetermined pattern image at a predetermined position on the recording carrier folded according to the folding procedure; and
　　image forming information selection accepting means for accepting selection of said plural sets of image forming information stored in said image forming information storing means, wherein
　　said image forming means forms on the recording carrier an image based on the folding procedure image data and/or the pattern forming image data included in one set of the image forming information whose selection is accepted by said image forming information selection accepting means.

8. The image forming apparatus as set forth in claim 7, wherein said image forming means forms on one recording carrier the image based on the folding procedure image data and the image based on the pattern forming image data included in one set of the image forming information.

9. The image forming apparatus as set forth in claim 7, further comprising displaying means for displaying the image showing the folding procedure based on the folding procedure image data included in one set of the image forming information, wherein
　　said image forming means forms on the recording carrier said image based on the pattern forming image data of the same set as said folding procedure image data of said image showing the folding procedure displayed on said displaying means.

10. The image forming apparatus as set forth in claim 7, wherein said image forming means forms the image based on the folding procedure image data and the image based on the pattern forming image data included in one set of the image forming information on a different recording carrier.

11. The image forming apparatus as set forth in claim 7, wherein said pattern image data includes directional image data for forming a directional image indicating the up-and-down direction on the recording carrier folded according to the folding procedure shown by the image based on the folding procedure image data.

12. The image forming apparatus as set forth in claim 7, further comprising means for externally transmitting the image forming information.

13. An image forming/processing apparatus for forming an image based on image data and executing a process based on a read image data, said image forming/processing apparatus comprising:
　　pattern image storing means for storing plural pattern image data, wherein each of the pattern image data is for forming plural pattern images on a recording carrier;
　　process information storing means for storing process designating information specifying a process to be executed in correspondence to each of the plural pattern image data;
　　folding procedure accepting means for accepting a folding procedure for folding the recording carrier;
　　pattern selection accepting means for accepting a selection of said plural pattern image data stored in said pattern image storing means;
　　position accepting means for accepting a forming position of an image based on the pattern image data whose selection is accepted by said folding procedure accepting means on the recording carrier folded according to the folding procedure accepted by said folding procedure accepting means;

image data generating means for generating a folding procedure image data for forming an image showing the folding procedure accepted by said folding procedure accepting means on the recording carrier, and pattern forming image data for forming an image based on the pattern image data whose selection is accepted by said pattern selection accepting means at said forming position accepted by said position accepting means on the recording carrier folded according to the folded procedures accepted by said folding procedure accepting means as one set of image forming information;

image forming means for forming on the recording carrier an image based on the folding procedure image data and/or the pattern forming image data included in one set of the image forming information generated by said image data generating means;

reading means for reading the image formed on the recording carrier folded according to the image showing the folding procedure formed by said image forming means, and obtaining image data; and processing means for, by reading the process designating information corresponding to the pattern image data that matches the image data obtained by said reading means from said process information storing means, executing a process based on the read process designating information.

* * * * *